US009906492B2

(12) United States Patent
Morita

(10) Patent No.: US 9,906,492 B2
(45) Date of Patent: Feb. 27, 2018

(54) GATEWAY DEVICE, AND SERVICE PROVIDING SYSTEM

(71) Applicant: HITACHI AUTOMOTIVE SYSTEMS, LTD., Hitachinaka-shi, Ibaraki (JP)

(72) Inventor: Nobuyoshi Morita, Tokyo (JP)

(73) Assignee: Hitachi Automotive Systems, Ltd., Ibaraki (JP)

( * ) Notice: Subject to any disclaimer, the term of this patent is extended or adjusted under 35 U.S.C. 154(b) by 335 days.

(21) Appl. No.: 14/654,257

(22) PCT Filed: Oct. 18, 2013

(86) PCT No.: PCT/JP2013/078253
§ 371 (c)(1),
(2) Date: Jun. 19, 2015

(87) PCT Pub. No.: WO2014/141518
PCT Pub. Date: Sep. 18, 2014

(65) Prior Publication Data
US 2015/0326529 A1 Nov. 12, 2015

(30) Foreign Application Priority Data

Mar. 11, 2013 (JP) .................................. 2013-047472

(51) Int. Cl.
*H04L 29/06* (2006.01)
*H04L 29/08* (2006.01)
(Continued)

(52) U.S. Cl.
CPC .............. *H04L 63/02* (2013.01); *G06F 21/62* (2013.01); *H04L 12/6418* (2013.01);
(Continued)

(58) Field of Classification Search
None
See application file for complete search history.

(56) References Cited

U.S. PATENT DOCUMENTS

2003/0009271 A1* 1/2003 Akiyama ............. G06F 21/335
701/29.6
2010/0204876 A1* 8/2010 Comeau ................. G07C 5/008
701/29.6
(Continued)

FOREIGN PATENT DOCUMENTS

JP 2001-225706 A 8/2001
JP 2004-133824 A 4/2004
(Continued)

*Primary Examiner* — Henry Tsang
(74) *Attorney, Agent, or Firm* — Volpe and Koenig, P.C.

(57) ABSTRACT

Provided are a control device, system, and method capable of controlling an accessible range of information on an individual external device basis even in the case of a valid access for the information from an external device. An ACL management server is installed to introduce an ACL associating a service provider ID identifying a service provider accessing an ECU mounted on an automobile with an attribute of an ECU that the service provider can access or with an ASIL determined for the ECU, and to manage the ACL safely and in the latest state. Also, a service providing server is installed for providing services for reading and rewriting ECU control information in accordance with a request from a user. A gateway is installed for determining, using the ACL, whether access to the ECU should be granted with respect to access instruction execution information received from the service providing server.

7 Claims, 28 Drawing Sheets

(51) Int. Cl.
*G06F 21/62* (2013.01)
*H04L 12/66* (2006.01)
*H04L 12/64* (2006.01)
*H04L 12/40* (2006.01)

(52) U.S. Cl.
CPC .............. *H04L 12/66* (2013.01); *H04L 67/16* (2013.01); *H04L 2012/40273* (2013.01)

(56) References Cited

U.S. PATENT DOCUMENTS

| | | |
|---|---|---|
| 2013/0173112 A1 | 7/2013 | Takahashi et al. |
| 2013/0219170 A1* | 8/2013 | Naitou ................ H04L 63/0428 713/153 |
| 2013/0227650 A1 | 8/2013 | Miyake |

FOREIGN PATENT DOCUMENTS

| | | |
|---|---|---|
| JP | 2005-343430 A | 12/2005 |
| JP | 2011-128775 A | 6/2011 |
| JP | 2012-104049 A | 5/2012 |
| JP | 2013-138320 A | 7/2013 |

* cited by examiner

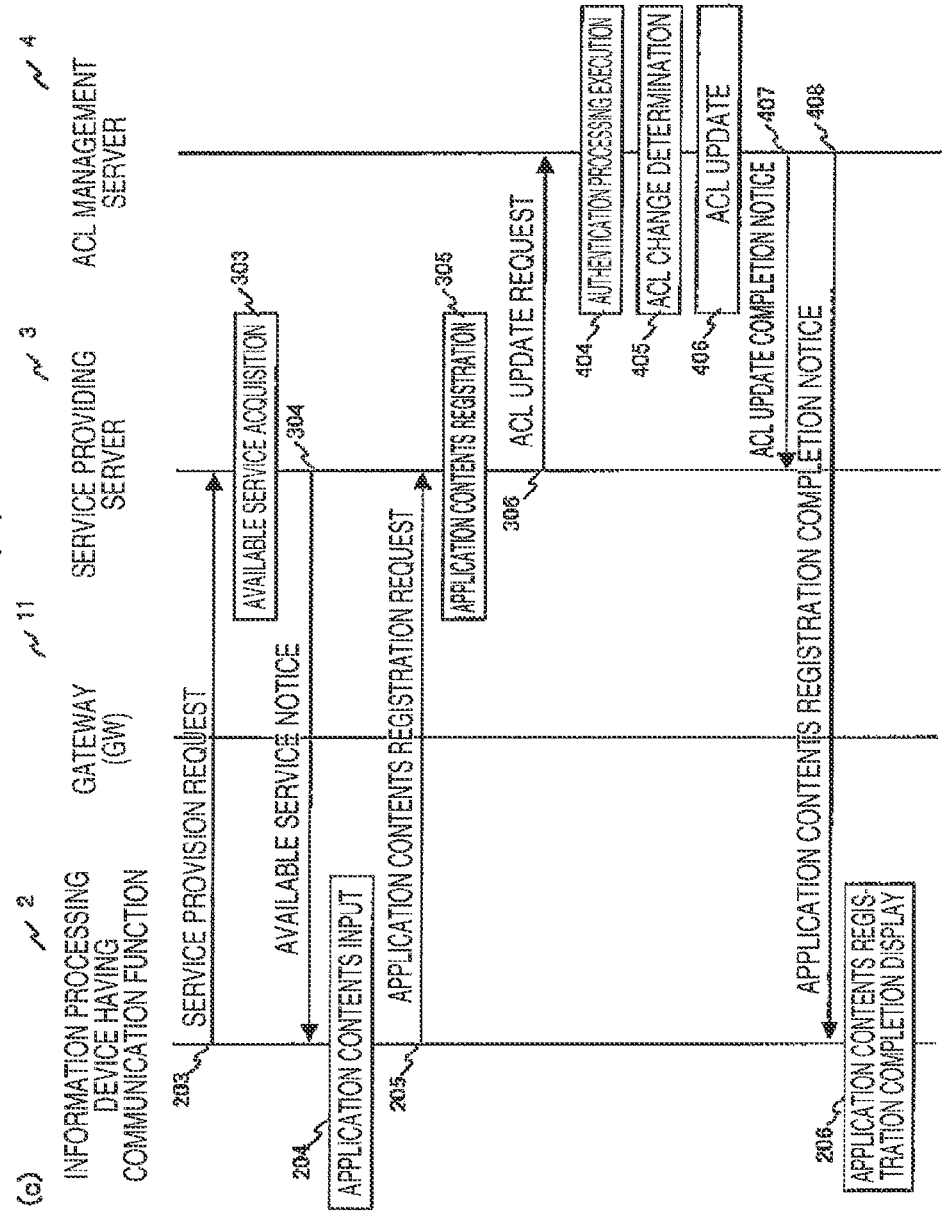

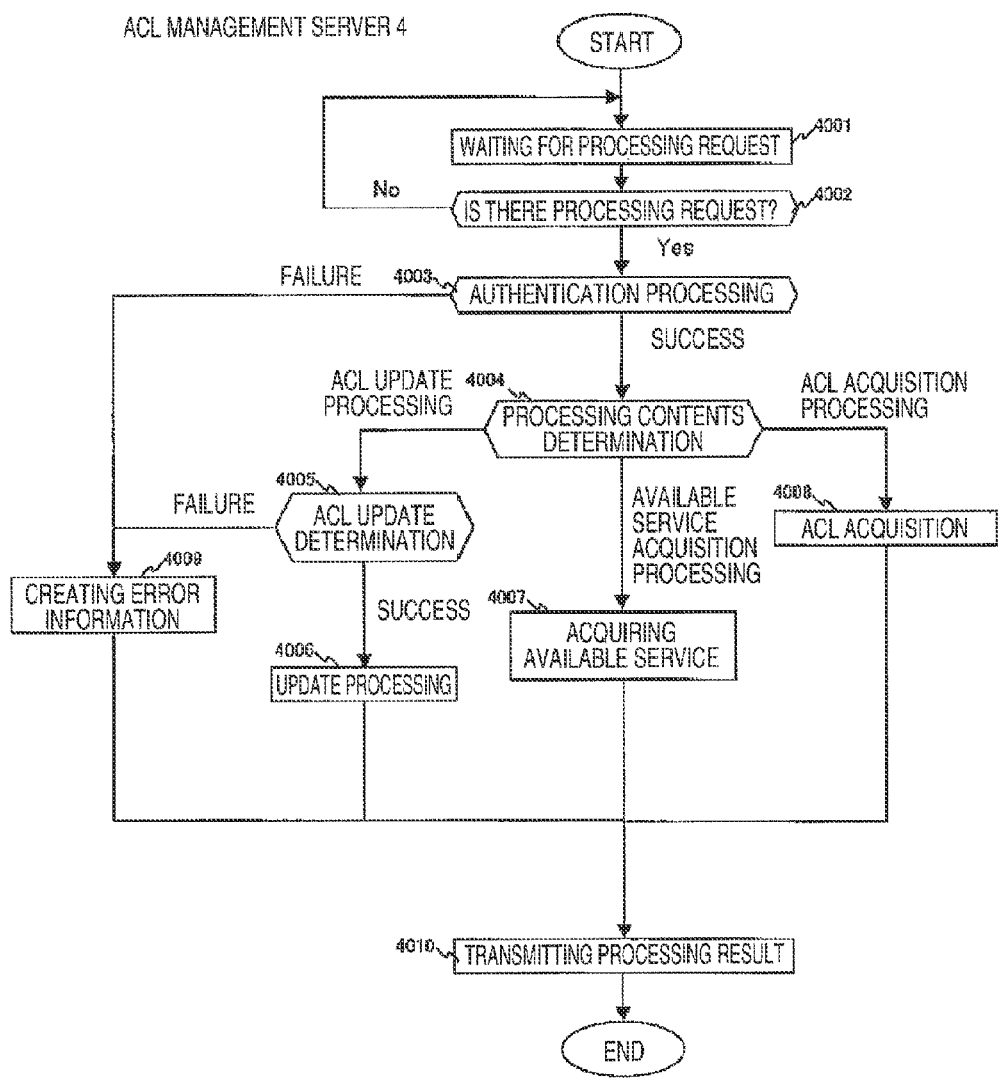

SERVICE PROVISION REQUEST SOURCE INFORMATION

| 3411 | 3412 | 3413 | 3414 | 3415 | 3416 | 3417 | 3418 |
|---|---|---|---|---|---|---|---|
| USER ID | USER NAME | USER PASS | VIN | MANUFAC-TURER | VEHICLE TYPE | VEHICLE COLOR | VEHICLE NUMBER |
| aaa.Bbb @kk.com | TARO HITACHI | $1$wpIfeWy W$dRnpRo1X DyGjQko1IM 3CT1 | 1FALP45D 9RF158493 | MANUFAC-TURER A | VEHICLE TYPE A | BLUE | TOKUSHIMA 500-KA 08-73 |
| ... | ... | ... | ... | ... | ... | ... | ... |
| sslekk.cc @ew.com | HANAKO HITACHI | $1$aSSAIoce $9LHIYnpmd W8mx3YK90ji C1 | 1HD1CAP1 APY999FE9 | | VEHICLE TYPE B | WHITE | SHINAGAWA 500-HA 34-55 |
| ... | ... | ... | ... | ... | ... | ... | ... |

ACCESS INSTRUCTION INFORMATION

| SERVICE PROVIDER ID 3421 | VIN 3422 | USER ID 3423 | INSTRUCTION COMMAND 3424 |
|---|---|---|---|
| AA1 | 1FALP45D9RF158493 | aaa.bbb@kk.com | readKeyLock |
| | | | ... |
| | | | writeKeyLock |
| | | | ... |
| | ... | ... | ... |

FIG. 12(c)

SERVICE CONTENTS LIST

| INSTRUCTION COMMAND | INSTRUCTION TYPE | CAN-ID | SERVICE CONTENTS | ATTRIBUTE TYPE |
|---|---|---|---|---|
| readKeyLock | READING | 10Fh | KEY-LOCK STATE READING | BODY-RELATED ECU |
| readEngine | | 32Dh | ENGINE REVOLUTION NUMBER READING | TRAVEL-RELATED ECU |
| readLight | | 22Ch | LIGHT-ON STATE READING | BODY-RELATED ECU |
| ... | | | | |
| writeKeyLock | REWRITING | 10Fh | KEY-LOCK STATE REWRITING | BODY-RELATED ECU |
| writeLight | | 22Ch | LIGHT-ON STATE REWRITING | BODY-RELATED ECU |
| ... | | | | ... |

FIG. 13(a)

| USER ID | USER PASS | VIN |
|---|---|---|
| aaa.bbb@kk.com | $1$wpkFeWyW$dRnpRoIXDyGxJQkc1IM3CT1 | 1FALP45D9RF158493 |
| sslekk.cc@ew.com | $1$aSSAloce$9LHIYnpmdW9mx3YK90jIC1 | 1HD1CAP1APY999999 |
| ... | ... | ... |

ACL ACQUISITION REQUEST SOURCE INFORMATION — 461
4611, 4612, 4613

SERVICE PROVIDER INFORMATION (462)

| SERVICE PROVIDER ID (4621) | SERVICE PROVIDER PASS (4622) | SERVICE PROVIDER TYPE (4623) |
|---|---|---|
| AA1 | $1$T1kemjDK$F9hEqhIS3YhjflbHleSqo0 | SECURITY COMPANY |
| AA2 | $1$YZEEoUYf$VTglvrD9nUVqpaN4vRwGR1 | DEALER |
| AA3 | $1$Eo5GrvyO$yTi8SflmogDjbj2LHJHs92 | AUTO MANU-FACTURER |
| ... | ... | ... |

FIG. 13(c)

ACCESS CONTENTS LIST (463)

| INSTRUCTION TYPE (4631) | ATTRIBUTE TYPE (4632) | CAN-ID (4633) | INSTRUCTION COMMAND (4634) |
|---|---|---|---|
| READING | BODY-RELATED ECU | 10Fh | readKeyLock |
|  |  | ... | ... |
|  | INFORMATION-RELATED ECU | ... | ... |
|  | TRAVEL-RELATED ECU | ... | ... |
|  | PT-RELATED ECU | ... | ... |
|  |  | ... | ... |
| REWRITING | BODY-RELATED ECU | 10Fh | writeKeyLock |
|  |  | ... | ... |
|  | ... | ... | ... |

FIG. 14(a)

| ACL CHANGE DETERMINATION INFORMATION 464 | | |
|---|---|---|
| SERVICE PROVIDER ID 4641 | UPDATABLE ATTRIBUTE PER SERVICE PROVIDER 4642 | |
| | REWRITING OBJECT | READING OBJECT |
| AA1 | BODY-RELATED ECU | BODY-RELATED ECU |
| | INFORMATION-RELATED ECU | INFORMATION-RELATED ECU |
| AA2 | BODY-RELATED ECU | BODY-RELATED ECU |
| | INFORMATION-RELATED ECU | INFORMATION-RELATED ECU |
| | TRAVEL-RELATED ECU | TRAVEL-RELATED ECU |
| AA3 | ALL ATTRIBUTES | ALL ATTRIBUTES |
| ... | ... | ... |

ACL

| VIN | USER ID | SERVICE PROVIDER ID | REWRITABLE CONTENTS | READABLE CONTENTS | UPDATE DATE AND TIME |
|---|---|---|---|---|---|
| 1FALP45D9RF158493 | aaa.bbb@kk.com | AA1 | BODY-RELATED ECU INFORMATION-RELATED ECU | BODY-RELATED ECU INFORMATION-RELATED ECU | 2012/10/16 /13:43 |
| | | AA2 | BODY-RELATED ECU INFORMATION-RELATED ECU TRAVEL-RELATED ECU | BODY-RELATED ECU INFORMATION-RELATED ECU TRAVEL-RELATED ECU | 2012/10/12 /10:55 |
| | | AA3 | ALL ATTRIBUTES | ALL ATTRIBUTES | ... |
| | ... | ... | ... | ... | ... |
| 1HD1CAP1APY999999 | ... | ... | ... | ... | ... |
| ... | | | | | |

| VIN | USER ID | SERVICE PROVIDER ID | REWRITABLE CONTENTS | READABLE CONTENTS | UPDATE DATE AND TIME | EXPIRATION DATE |
|---|---|---|---|---|---|---|
| 1511 | 1512 | 1513 | 1514 | 1515 | 1516 | 1517 |

DETERMINATION ACL

| VIN | USER ID | SERVICE PROVIDER ID | REWRITABLE CONTENTS | READABLE CONTENTS | UPDATE DATE AND TIME | EXPIRATION DATE |
|---|---|---|---|---|---|---|
| 1FALP45D 9RF158493 | aaa.bbb@ kk.com | AA1 | BODY-RELATED ECU INFORMATION-RELATED ECU | BODY-RELATED ECU INFORMATION-RELATED ECU | 2012/10/16 /13:43 | 2012/ 10/20 /00:00 |
|  |  | AA2 | BODY-RELATED ECU INFORMATION-RELATED ECU TRAVEL-RELATED ECU | BODY-RELATED ECU INFORMATION-RELATED ECU TRAVEL-RELATED ECU | 2012/10/12 /10:55 |  |
|  |  | AA3 | ALL ATTRIBUTES | ALL ATTRIBUTES | ... |  |
|  | ... | ... | ... | ... | ... |  |

FIG. 15(b)

ACCESS REQUEST SOURCE INFORMATION — 152

| USER ID (1521) | USER PASS (1522) | TERMINAL ID (1523) | ... |
|---|---|---|---|
| aaa.bbb@kk.com | $1$wpkFeWyW$dRnpRo1XDyGJQkc1IM3CT1 | 00:23:18:67:52:ed | ... |
| sslekk.cc@ew.com | $1$aSSAlbce$9LHiYnpmdW9mx3YK90jiG1 | a4:6e:18:56:5d:ff | ... |
| ... | ... | ... | ... |

ACCESS DESTINATION TRANSFORMATION INFORMATION (153)

| ATTRIBUTE TYPE (1531) | CAN-ID (1532) |
|---|---|
| BODY-RELATED ECU | 10Fh |
|  | 2D1h |
|  | ... |
| INFORMATION-RELATED ECU | ... |
| TRAVEL-RELATED ECU | ... |
| ... | ... |

ACCESS EXECUTION INSTRUCTION INFORMATION

| SERVICE PROVIDER ID (1541) | VIN (1542) | USER ID (1543) | INSTRUCTION COMMAND (1544) | CAN-ID (1545) |
|---|---|---|---|---|
| AA1 | 1FALP45D9RF158493 | aaa.bbb@kk.com | readKeyLock | 10Fh |

USER RELATED INFORMATION

| TERMINAL ID (2611) | USER ID (2612) | USER NAME (2613) | VIN (2614) |
|---|---|---|---|
| 00:25:d3:b6:f2:ae | aaa.bbb@kk.com | TARO HITACHI | 1FALP45D9RF158493 |
| | | ... | |

ACQUIRED ACCESS INSTRUCTION INFORMATION 252

| VIN 2521 | SERVICE PROVIDER ID 2522 | CAN-ID 2523 | INSTRUCTION COMMAND 2524 |
|---|---|---|---|
| 1FALP45D 9RF158493 | AA1 | 10Fh | readKeyLock |
| | | 10Fh | writeKeyLock |
| | | ... | ... |
| | ... | ... | ... |
| ... | ... | ... | ... |

FIG. 17(c)

| VIN | SERVICE PROVIDER ID | REWRITABLE CONTENTS | READABLE CONTENTS | UPDATE DATE AND TIME | EXPIRATION DATE |
|---|---|---|---|---|---|
| 1FALP45D 9RF158493 | AA1 | BODY-RELATED ECU INFORMATION-RELATED ECU | BODY-RELATED ECU INFORMATION-RELATED ECU | 2012/10 /16 /13:43 | 2012/ 10/20 /00:00 |
| | AA2 | BODY-RELATED ECU INFORMATION-RELATED ECU TRAVEL-RELATED ECU | BODY-RELATED ECU INFORMATION-RELATED ECU TRAVEL-RELATED ECU | 2012/10 /12 /10:55 | |
| | AA3 | ALL ATTRIBUTES | ALL ATTRIBUTES | ... | |
| ... | ... | ... | ... | ... | |

ACQUIRED ACL (c)

GATEWAY DEVICE, AND SERVICE PROVIDING SYSTEM

TECHNICAL FIELD

A subject disclosed herein relates to a device, system, and method for preventing unauthorized access to information stored in an electronic control unit (hereinafter ECU) in a vehicle.

BACKGROUND ART

Some conventional vehicle ECUs controlling an engine or the like store control information in a non-volatile memory capable of rewriting data. Such control information can be rewritten even after supply to the market. Because the control information stored in the non-volatile memory can be rewritten using a dedicated rewriting device (hereinafter a dedicated rewriting device) like a reprogramming apparatus owned by a dealer, an ECU has a problem of being incapable of preventing unauthorized access to the control information if the dedicated rewriting device itself is stolen, if information inside the dedicated rewriting device is stolen, or if a false device impersonates an authorized dedicated rewriting device.

In order to address such a problem, Patent Literature 1 (paragraph 0020) describes a system that prevents unauthorized access to the control information in the ECU even if the dedicated rewriting device or information inside the dedicated rewriting device is stolen.

In addition, Patent Literature 2 (paragraph 0013) describes a system that introduces a gateway in an on-vehicle network comprising the above-described ECU and thereby prevents unauthorized access to the ECU due to spoofing by a false device.

CITATION LIST

Patent Literature

PATENT LITERATURE 1: JP-A-2001-225706
PATENT LITERATURE 2: JP-A-2005-343430

SUMMARY OF INVENTION

Technical Problem

Information stored in the ECU is expected to be accessed from now on by a device (hereinafter external connection device) such as an information processing device having a communication function like a smart phone, and a server on the Internet. Access to the information stored in the ECU by the external connection device may be opened to not only an auto manufacturer and a dealer but also to various service providers aiming to prevent theft, support safe driving, or the like as far as safe driving is not affected.

Therefore, it becomes necessary to set authority per service provider and control (permit or reject) access depending on the set authority. However, Patent Literatures 1 and 2 do not describe a function to distinguish a plurality of service providers and set their respective accessible ranges.

Solution to Problem

In view of the foregoing problem, a gateway device, system, and method are disclosed herein that control whether access to information should be granted or not depending on authority set to any other device or a user of the other device regarding access by the other device to the information stored in a device connected with a network. At a time of control, it is preferable to control depending on in access types (for example, reading or writing).

The device having stored information is, for example, a vehicle electronic control unit (ECU) connected with an on-vehicle network, and the other device is a device that tries to access the above-described ECU via an external network connected with the on-vehicle network and is installed at various service providers like the above-described ones.

In particular, disclosed are a vehicle information relay control system and its method that are able to control whether access to each ECU or individual information stored in each ECU should be granted or not per device, which is an access source, of a service provider connected with the external network depending on conditions including an access type.

More particularly, a gateway is installed for performing motor control and access determination control for a processing device storing information; a service providing server is installed at a service provider site for providing services of reading and rewriting control information on the processing device according to a request from a user; and an ACL management server is installed at an auto manufacturer site for managing an access control list (hereinafter ACL). The ACL management server manages the ACL defining an accessible range (processing devices, access types, and accessible information) and ACL change determination information to determine whether change of the ACL (contents change, or addition or deletion) is allowed or not per service provider, and transmits the ACL to the gateway at a time of service use. In addition, the user uses an information processing device having a communication function like a smart phone in order to request service execution of a service provider.

First, the service providing server at the service provider acquires available service contents from the ACL management server before accessing the gateway.

At a time of service application contents registration, the information processing device having a communication function owned by the user acquires, for example, a vehicle identification number (hereinafter VIN) as an identifier of an automobile from the gateway, and transmits the VIN, user information, and a request requesting the service provider to perform new registration or change (including addition or deletion) of service contents the service provider is desired to provide to the service providing server.

The service providing server requests the ACL management server to change service provision permission contents.

The ACL management server compares the contents requested by the service providing server with the ACL change determination information, and determines whether access to a processing device necessary for the requested service provision should be granted or not. If an accessible range for the service provider is defined by the ACL change determination information, the ACL management server changes the ACL. If the accessible range for the service provider is not defined by the ACL change determination information, the ACL management server does not change the ACL and notifies the service providing server of an error.

If a service desired by the user has already been registered with the service providing server, the service providing server notifies the gateway of access instruction information on the basis of a service execution request transmitted by the information processing device having a communication function owned by the user.

Receiving the access instruction information from the service providing server, the gateway acquires the ACL from the ACL management server. If the ACL permits access to the processing device necessary to provide the service requested by the service providing server, the gateway executes the requested service, and notifies the service providing server of the execution result. If the ACL does not permit access necessary to provide the service, the gateway notifies the service providing server of an error.

In addition, the ACL management server may transmit a changed ACL to the information processing device having a communication function after imparting expiration date to the changed ACL. In addition, the service providing server may transmit the access instruction information to the information processing device having a communication function if it cannot communicate with the gateway.

According to the above processing, the information processing device having a communication function transmits the transmitted access instruction information at a time of the service execution request to the gateway if the gateway cannot connect with the service providing server and the ACL management server due to a radio wave being unable to reach, but the information processing device having a communication function is able to perform short-range communication without going through the server like Bluetooth® communication or universal serial bus (hereinafter USB) connection with the gateway.

The gateway holds the received access instruction information, and acquires the ACL from the information processing device having a communication function. If the gateway has already held the ACL, the gateway compares expiration date and change date and time of the respective ACLs, uses an ACL within its expiration date and having the latest change date and time to perform access control, and executes a service on the basis of the access execution instruction information. If the gateway does not hold the ACL, the gateway checks the expiration date of the ACL acquired from the information processing device having a communication function. If the ACL is within the expiration date, the gateway uses it as an ACL for access control, and executes a service on the basis of the access execution instruction information. If the ACL is beyond the expiration date, the gateway gives notice of an error.

If the gateway cannot establish local communication with the information processing device having a communication function either, the gateway checks if it holds an ACL. If the gateway holds an ACL, it checks the expiration date, and if the ACL is within the expiration date, the gateway uses it as an ACL for access control, and if it is beyond the expiration date, the gateway gives notice of an error. If the gateway does not hold an ACL, it gives notice of an error.

Advantageous Effects of Invention

According to the disclosure, a range of accessible information can be controlled depending on an external device or a user of the external device even in the case of valid access to information from the external device.

BRIEF DESCRIPTION OF DRAWINGS

FIG. 3(c) illustrates an application contents registration processing sequence.

FIG. 11 illustrates a schematic processing flowchart at an ACL management server in order to achieve ACL acquisition, available service acquisition, and ACL change.

FIG. 12(a) illustrates a table configuration of service provision request source information at a service information management unit.

FIG. 12(b) illustrates a table configuration of access instruction information at the service information management unit.

FIG. 12(c) illustrates a table configuration of a service contents list at the service information management unit.

FIG. 13(a) illustrates a table configuration of ACL acquisition request source information at an ACL management unit.

FIG. 13(b) illustrates a table configuration of service provider information at the ACL management unit.

FIG. 13(c) illustrates a table configuration of an access contents list at the ACL management unit.

FIG. 14(a) illustrates a table configuration of ACL change determination information at the ACL management unit.

FIG. 14(b) illustrates a table configuration of a change determination ACL at the ACL management unit.

FIG. 15(a) illustrates a table configuration of a determination ACL at an access control management unit.

FIG. 15(b) illustrates a table configuration of access request source information at the access control management unit.

FIG. 16(a) illustrates a table configuration of access destination transformation information at the access control management unit.

FIG. 16(b) illustrates a table configuration of access execution instruction information at the access control management unit.

FIG. 17(a) illustrates a table configuration of user information at an access information management unit.

FIG. 17(b) illustrates a table configuration of acquired access instruction information at the access information management unit.

FIG. 17(c) illustrates a table configuration of an acquired ACL at the access information management unit.

DESCRIPTION OF EMBODIMENTS

Embodiments will now be explained in detail referring to drawings.

In the following embodiments, examples of a vehicle information relay control system and a method are used, the vehicle information relay control system enabling fine control of an access range to an ECU by distinguishing a service provider by setting an accessible range according to authority per service provider as an ACL, and further enabling safe management of the accessible range even in a manager absent situation specific to on-vehicle network systems by an ACL management server at an auto manufacturer changing and deleting the ACL using ACL change determination information. Furthermore, it is preferable that a communication network between devices should use safe communication, for example, employing SSL protocol, data encryption, and data authentication.

First Embodiment

As a first embodiment, a gateway device (hereinafter simply called as a gateway) 11 is assumed to be able to communicate with an ACL management server 4 at a time of service use.

Figure 1:
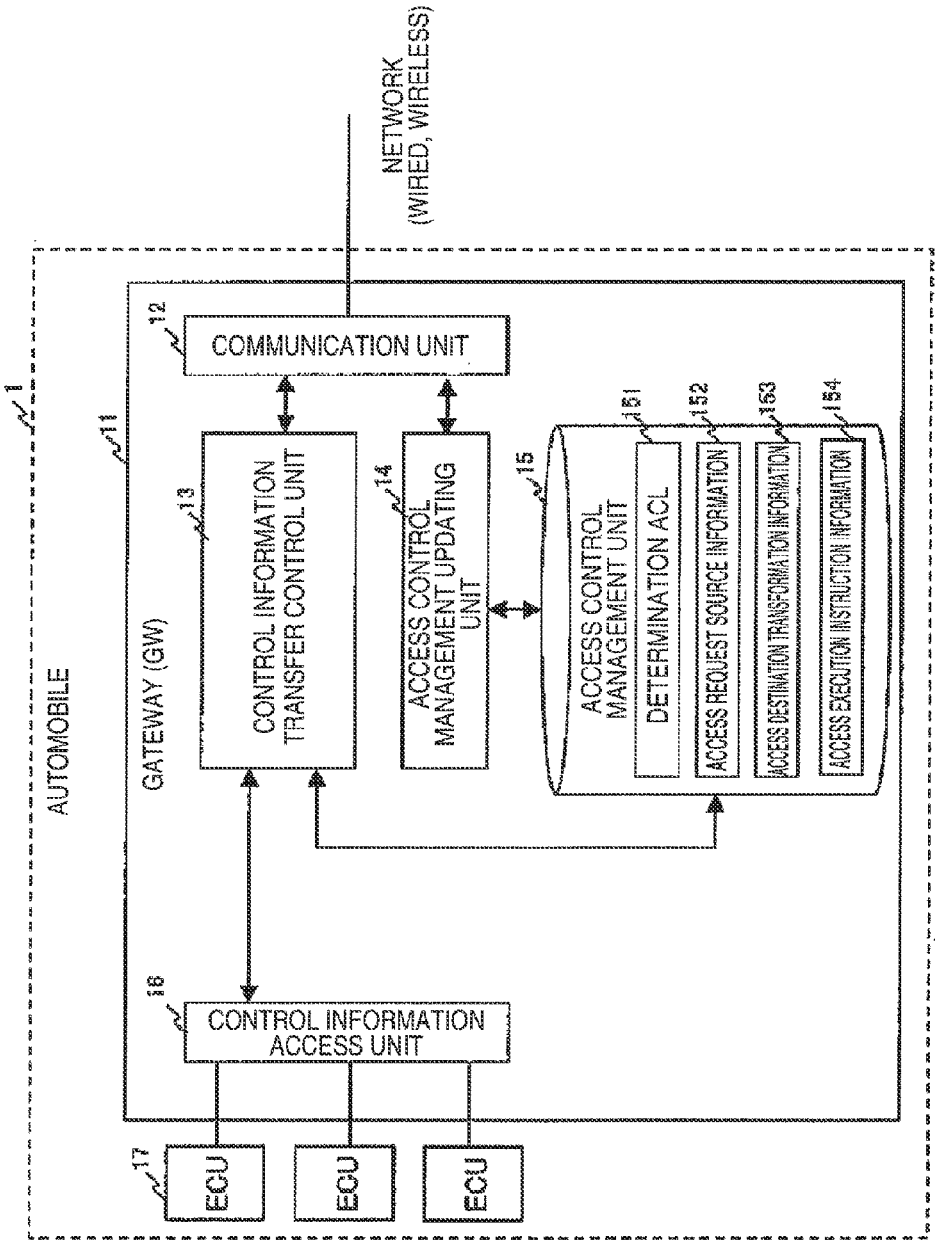
FIG. 1 illustrates a configuration of a gateway and an on-vehicle network system including the gateway.

FIG. 1 shows a configuration of a gateway and an on-vehicle network system including the gateway in the embodiment of the present invention.

An on-vehicle network of an automobile 1 is connected with the gateway 11, and the gateway 11 is further connected with ECUs 17.

The gateway 11 includes: (1) a communication unit 12 that is in charge of transmitting and receiving messages between the on-vehicle network and an external network; (2) a control information transfer control unit 13 that determines whether access from the external network should be granted or not using a determination ACL 151 and access destination transformation information 153, and transmits access execution instruction information 154 to give an instruction on permitted access to a control information access unit 16; (3) an access control management unit 15 that holds, in a tamper-resistant region, the determination ACL 151, access request source information 152, the access destination transformation information 153, and the access execution instruction information 154 described below; (4) access control management updating unit 14 that acquires an ACL and an access instruction from the external network, updates the determination ACL 151 and/or the access execution instruction information 154 held by the access control management unit 15, and performs authentication using the access request source information 152 when receiving a VIN acquisition request from the external network; and (5) a control information access unit 16 that transmits the access execution instruction information 154 received from the control information transfer control unit 13 to an ECU 17, and transmits a message received from the ECU 17 to the control information transfer control unit 13.

In addition, the gateway 11 includes a memory capable of temporarily holding data and a program, a CPU for controlling execution of a program, and other necessary hardware (none of them shown), and embodies the respective processing units described in the above (1)-(5) by the CPU executing the program stored in the memory and operating in coordination with the hardware.

As the communication unit 12, it is assumed to use, for example, a data communication chip or card, or USB port using a mobile phone network or wireless LAN.

When the access control management updating unit 14 receives access to the ECU 17 from the external network, it acquires an ACL from a server managing the ACL on the external network and updates the determination ACL 151. In addition, when there are changes in the access request source information 152 and the access destination transformation information 153, it updates the respective information.

The control information transfer control unit 13 performs authentication processing by using the access request source information 152, stores an access instruction received from the external network in the access execution instruction information 154, determines an access right to the ECU 17 by using the determination ACL 151 and the access destination transformation information 153, and performs transfer control of the access instruction received from the external network.

Figure 2:
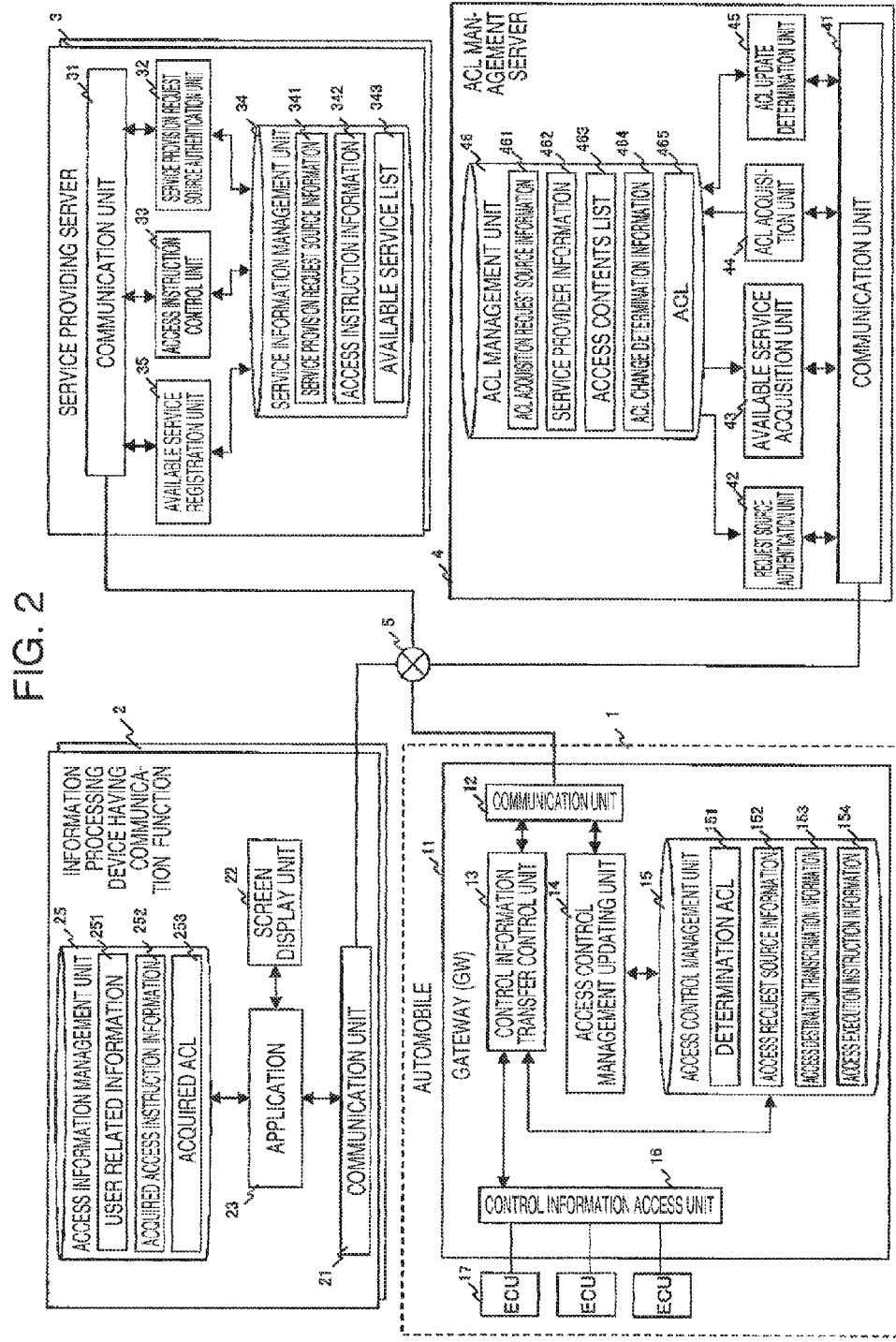
FIG. 2 illustrates a configuration of an entire system for coordinating the gateway with devices outside a vehicle.

FIG. 2 shows a configuration of an entire system for coordination of the gateway and devices outside a vehicle. The gateway 11 connected with the on-vehicle network of the automobile 1, an information processing device having a communication function 2, a service providing server 3, and an ACL management server 4 are connected with each other via a communication network 5.

FIG. 15 shows an example of table configurations of the determination ACL 151 and the access request source information 152 stored in the access control management unit 15.

The access control management updating unit 14 acquires an ACL 465 from the ACL management server 4 when receiving a message from the external network, and stores it as the determination ACL 151 in the access control management unit 15. The control information transfer control unit 13 uses the determination ACL 151 for determining whether access from the external network should be granted or not. A VIN 1511 is a specific value to identify an automobile. A user ID 1512 is a specific value to identify a service registrant. A service provider 1513 is a specific value to identify a service provider.

In rewritable contents 1514, an attribute of an ECU is set which ECU the service provider is able to perform rewriting processing on. For example, a type of ECU such as information-related or travel-related is set. In readable contents 1515, similarly an attribute of an ECU is set which ECU the service provider is able to perform reading processing on. Change date and time 1516 is change date and time of an ACL per service provider. Expiration date 1517 is a period of validity within which the determination ACL 151 can be used for access determination control.

In addition, in the rewritable contents 1514 and the readable contents 1515, automotive safety integrity (hereinafter ASIL, the ASIL being a criterion modified for an automobile of a criterion representing safe performance of a system or device in IEC 61508) defined for each ECU or ECU function may be set instead of a type of ECU. For example, if at a service provider ID "AA1," levels "A" and "B" are set in the rewritable contents 1514 and "A," "B" and "C" are set in the readable contents 1515, a service provider having the service provider ID "AA1" indicates that it is able to rewrite in ECUs whose ASIL is "A" or "B" and is able to read from ECUs whose ASIL is "A," "B" or "C."

The access control management updating unit 14 uses the access request source information 152 for authentication at a time of VIN acquisition request from the information processing device having a communication function 2. A user ID 1521 is a specific value to identify a user owning the information processing device having a communication function 2. A user PASS 1522 is a specific value uniquely defined for the user ID 1521. A terminal ID 1523 is a specific value to identify each information processing device having a communication function 2.

Here, it is assumed that the access request source information 152 is initially registered by an auto manufacturer when it makes a contract with a user, and update processing later such as addition, change, and deletion can be performed by any of the registered user and the auto manufacturer in their authority.

FIG. 16 shows an example of table configurations of the access destination transformation information 153 and the access execution instruction information 154.

The access destination transformation information 153 is information associating a CAN-ID included in an access instruction received from the service providing server 3 with an attribute type set to the determination ACL 151. An attribute type 1531 is a type of ECU connected with the on-vehicle network. A CAN-ID 1532 is a specific value to identify an access destination of each ECU.

In addition, attributes set to the rewritable contents 1514 and the readable contents 1515 may be set per ECU function instead of per ECU. Then, the access destination transformation information 153 associates the attribute with a specific value capable of identifying each function instead of the CAN-ID 1532.

Here, it is assumed that the access destination transformation information 153 is initially registered by the auto manufacturer when it makes a contract with a user, and update processing later such as addition, change, and deletion can be performed by any of the registered user and the auto manufacturer in their authority.

The access control management updating unit 14 temporarily stores a combination of the access instruction information and the CAN-ID received from the service providing server 3 in the access execution instruction information 154.

A service provider ID 1541 is a specific value to identify a service provider which is a transmission source of the access instruction. A VIN 1542 is a VIN of an automobile equipped with the gateway 11 which is a transmission destination of the access instruction. A user ID 1543 is a specific value to identify an owner of the automobile of the VIN 1542. An instruction command 1544 is a command to be transmitted to an ECU. A CAN-ID 1545 is a specific value to identify an ECU to which the instruction command 1544 is transmitted.

The information processing device having a communication function 2 includes: (1) a communication unit 21 that is in charge of transmitting and receiving messages to/from the gateway 11, the service providing server 3, and the ACL management server 4; (2) a screen display unit 22 that displays operation contents of the user and a received processing result on a screen; (3) an application 23 that requests VIN acquisition of the gateway 11, requests service registration of the service providing server 3, registers user related information 251, and requests the service providing server 3 or the gateway 11 to perform a service; and (4) an access information management unit 25 that holds the user related information 251, acquired access instruction information 252, and acquired ACL 253 in a tamper-resistant region.

In addition, the information processing device having a communication function 2 includes a memory capable of temporarily holding data and a program, a CPU for controlling execution of a program, and other necessary hardware (none of them shown), and embodies the respective processing units described in the above (1)-(4) by the CPU executing the program stored in the memory and operating in coordination with the hardware.

FIGS. 17(*a*), 17(*b*) and 17(*c*) show an example of table configurations of the user related information 251, the acquired access instruction information 252, and the acquired ACL 253 held by the access information management unit 25, respectively.

The application 23 stores information input at a time of user authentication at the gateway 11 and the service providing server 3, and a VIN acquired from the gateway 11 in the user related information 251. A terminal ID 2511 is a specific value to identify the information processing device having a communication function 2 owned by the user. A user ID 2512 is a specific value to identify a user, an owner of the automobile 1. A user name 2513 is a name of the user associated with the user ID 2512. A VIN 2514 is a VIN of the automobile owned by the user corresponding to the user ID 2512.

In order to achieve access determination control at the gateway 11 even in a situation of the gateway 11 being unable to communicate with the service providing server 3, the application 23 acquires access instruction information 342 from the service providing server 3 and a CAN-ID 3433 associated with an instruction command 3424 from a service contents list 343 at a time of service registration, and stores them as the acquired access instruction information 252. A VIN 2521 is a VIN of the automobile 1 owned by the user ID 2512. A service provider ID 2522 is a specific value to identify a service provider registered by the user ID 2512. A CAN-ID 2523 is a specific value to identify a transmission destination ECU of an instruction command 2524. The instruction command 2524 is a command to be transmitted to the ECU.

The application 23 acquires a record, which uses a user ID as a key, from the ACL 465 of the ACL management server 4 at a time of ACL change, and stores it as the acquired ACL 253. A VIN 2531 is a VIN of the automobile 1 owned by the user ID 2512. A service provider ID 2532 is a specific value to identify a service provider accessing the gateway 11. Rewritable contents 2533 are ranges of ECUs the service provider ID 2532 is able to rewrite. Readable contents 2534 are ranges of ECUs the service provider ID 2532 is able to read. Change date and time 2535 is date and time when each record of the ACL 465 was changed. Expiration date 2536 is a period of validity of the acquired ACL 253.

The service providing server 3 includes: (1) a communication unit 31 that is in charge of transmitting and receiving messages to/from the gateway 11, the information processing device having a communication function 2, and the ACL management server 4; (2) a service provision request source authentication unit 32 that registers information on a service provision request source with service provision request source information 341, and authenticates the service provision request source; (3) an access instruction control unit 33 that acquires access instruction contents, and transmits them to the gateway 11; (4) an available service registration unit 35 that requests the ACL management server to acquire an available service and to change an ACL, and provides the acquired service for the information processing device having a communication function 2; and (5) a service information management unit 34 that holds the service provision request source information 341 and the access instruction information 342.

In addition, the service providing server 3 includes a memory capable of temporarily holding data and a program, a CPU for controlling execution of a program, and other necessary hardware (none of them shown), and embodies the respective processing units described in the above (1)-(5) by the CPU executing the program stored in the memory and operating in coordination with the hardware.

FIGS. 12(*a*), 12(*b*) and 12(*c*) show an example of table configurations of the service provision request source information 341, the access instruction information 342, and the service contents list 343 held by the service information management unit 34, respectively.

The service provision request source authentication unit 32 uses the service provision request source information 341 at a time of authenticating the information processing device having a communication function 2 that has requested service provision. A user ID 3411 is a specific value to identify a user requesting service provision. A user name 3412 is a name of the user associated with the user ID 3411. A user PASS 3413 is a password of the user associated with the user ID 3411 in order to check authenticity of the user. A VIN 3414 is a VIN of an automobile owned by the user having the user ID 3411. A manufacturer 3415 is a manufacturer of the VIN 3414. A vehicle type 3416 is a type of the automobile of the VIN 3414. A vehicle color 3417 is a color of the automobile of the VIN 3414. A vehicle number 3418 is a number of the automobile of the VIN 3414.

The access instruction control unit 33 transmits a relevant record of the access instruction information 342 and the CAN-ID 3433 associated with the instruction command 3424 to the gateway 11 when receiving a service execution request from the information processing device having a communication function 2. The gateway 11 holds the relevant record of the access instruction information 342 and the CAN-ID 3433 associated with the instruction command 3424 as a record of the access execution instruction information 154.

A service provider ID 3421 is a specific value to identify a service provider managing the access instruction information 342. A VIN 3422 is a VIN of an automobile equipped with a transmission destination gateway of the access instruction information. A user ID 3423 is a specific value to identify a user having requested service execution. It is a specific value to identify an access destination to transmit the instruction command 3424. The instruction command 3424 is a control command to an ECU 17.

The available service registration unit 35 transmits a service contents list 343 to the information processing device having a communication function 2 when receiving an available service acquisition request from the information processing device having a communication function 2. An instruction command 3431 is a control command to the ECU 17. An instruction type 3432 distinguishes between "reading" and "rewriting" as a type of instruction command. The CAN-ID 3433 is a specific value to identify a transmission destination ECU of the instruction command 3424. Service contents 3434 are service contents of the instruction command 3431. An attribute type 3435 is an attribute of an ECU which is a transmission destination indicated by the CAN-ID 3433. The service contents list 343 is acquired from the ACL management server 4 by the service providing server 3 when the service providing server 3 requests the ACL management server 4 to transmit an available service.

The ACL management server 4 includes: (1) a communication unit 41 that is in charge of transmitting and receiving messages to/from the gateway 11 and the service providing server 3; (2) a request source authentication unit 42 that authenticates a change request source referring to service provider information 462 when receiving an ACL change request from the service providing server 3, and also authenticates an acquisition request source referring to ACL acquisition request source information 461 when receiving an ACL acquisition request from the gateway 11; (3) an available service acquisition unit 43 that acquires a relevant service from an access contents list 463 when receiving an available service acquisition request from the service providing server 3; (4) an ACL acquisition unit 44 that acquires the ACL 465; (5) an ACL change determination unit 45 that determines whether change should be granted or not referring to ACL change determination information 464 and changes the ACL 465 when receiving an ACL change request; and (6) an ACL management unit 46 that holds the ACL acquisition request source information 461, the service provider information 462, the access contents list 463, the ACL change determination information 464, and the ACL 465.

In addition, the ACL management server 4 includes a memory capable of temporarily holding data and a program, and a CPU for controlling execution of a program.

In addition, the ACL management server 4 includes a memory capable of temporarily holding data and a program, a CPU for controlling execution of a program, and other necessary hardware (none of them shown), and embodies the respective processing units described in the above (1)-(6) by the CPU executing the program stored in the memory and operating in coordination with the hardware.

FIGS. 13(*a*), 13(*b*) and 13(*c*) show an example of table configurations of the ACL acquisition request source information 461, the service provider information 462, and the access contents list 463 heled by the ACL management unit 46, respectively.

The request source authentication unit 42 uses the ACL acquisition request source information 461 at a time of authenticating the gateway 11 requesting ACL acquisition. A user ID 4611 is a specific value to identify an owner of the automobile 1 equipped with the gateway 11 capable of acquiring an ACL. A user PASS 4612 is a unique specific value associated with the user ID 4611. A VIN 4613 is a VIN of the automobile 1 owned by the user ID 4611. For example, information held in the ACL acquisition request source information 461 may be set by an auto manufacturer when the auto manufacturer makes a contract with a user.

The request source authentication unit 42 uses the service provider information 462 at a time of authenticating the service providing server 3 requesting ACL change. Service provider ID 4621 is a specific value to identify a service provider capable of changing the ACL. A service provider PASS 4622 is a unique specific value associated with the service provider ID 4621. A service provider type 4623 is a type of industry of the service provider ID 4621. For example, information held in the service provider information 462 may be set by an auto manufacturer when the auto manufacturer makes a contract with a service provider.

The available service acquisition unit 43 transmits a relevant record in the access contents list 463 using the ACL change determination information 464 and using an accessible attribute associated with a service provider ID 4641 as a key to the service providing server 3 when requested to acquire an available service by the service providing server 3. An instruction type 4631 distinguishes between "reading" and "rewriting" as a type of instruction command. An attribute type 4632 is an attribute of an ECU which is a transmission destination indicated by a CAN-ID 4633. The CAN-ID 4633 is a specific value to identify a transmission destination ECU of an instruction command 4634.

FIGS. 14(*a*) and 14(*b*) show an example of table configurations of the ACL change determination information 464 and the ACL 465 heled by the ACL management unit 46, respectively.

The ACL change determination unit 45 uses the ACL change determination information 464 as a criterion for change determination when ACL change is requested by the service providing server 3. The service provider ID 4641 is a specific value to identify a service provider having obtained permission for service provision from an auto manufacturer. Accessible attributes 4642 per service provider are ranges of a rewriting object and a reading object accessible for the service provider ID 4641. In addition, the accessible attribute 4642 per service provider may be limited by using ASIL instead of an attribute. For example, accessibility of the service provider ID "AA1" may be limited to ECUs whose ASIL is "A" as a rewriting object, and ECUs whose ASIL is "A" or "B" as a reading object.

The ACL acquisition unit 44 acquires the ACL 465 and transmits it to the gateway 11 when receiving ACL acquisition request from the gateway 11. A VIN 4651 is a VIN of the automobile 1 equipped with the gateway 11 requesting the ACL acquisition. A user ID 4652 is a specific value to identify an owner of the automobile 1 equipped with the gateway 11 requesting ACL acquisition. A service provider ID 4653 is a specific value to identify a service provider accessing the gateway 11. Rewritable contents 4654 are ranges of ECUs the service provider ID 4653 is able to rewrite. Readable contents 4655 are ranges of ECUs the service provider ID 4653 is able to read. Change date and time 4656 is date and time when each record of the ACL 465 was changed.

FIG. 3(*a*) shows a schematic processing sequence of the service providing server 3 acquiring an available service from the ACL management server 4.

At step 301, the available service registration unit 35 transmits an available service acquisition request to the ACL management server 4.

At step 401, the request source authentication unit 42 refers to the service provider information 462 and performs authentication processing of the service providing server 3.

At step 402, the available service acquisition unit 43 acquires a service that can be provided by a service provider from the ACL change determination information 464.

At step 403, the available service acquisition unit 43 transmits the available service acquired at the step 402 to the service providing server 3.

At step 302, the access instruction control unit 33 registers the received available service with the access instruction information 342.

The above steps enable the service providing server 3 to acquire the available service.

FIG. 3(*b*) shows a schematic processing sequence of the information processing device having a communication function 2 acquiring a VIN from the gateway 11.

At step 201, the application 23 transmits a VIN acquisition request to the gateway 11.

At step 101, the access control management updating unit 14 performs authentication processing of a request source information processing device having a communication function.

At step 102, the control information transfer control unit 13 acquires the VIN 1511 held in the determination ACL.

At step 103, the control information transfer control unit 13 transmits the VIN acquired at the step 102 to the information processing device having a communication function 2.

At step 202, the application 23 registers the received VIN with the user related information 251. Preferably, the user related information 251 is in a tamper-resistant region.

The above steps enable the information processing device having a communication function 2 to acquire the VIN from the gateway 11.

FIG. 3(*c*) shows a schematic processing sequence of service initial registration.

At step 203, the application 23 transmits a service provision request to the service providing server 3.

At step 303, the available service registration unit 35 acquires the service contents 3434 from the service contents list 343.

At step 304, the available service registration unit 35 transmits the service contents list 343 acquired at the step 303 to the information processing device having a communication function 2.

At step 204, the application 23 displays application contents on the screen of the information processing device having a communication function 2 by using the screen display unit 22.

Figure 18:
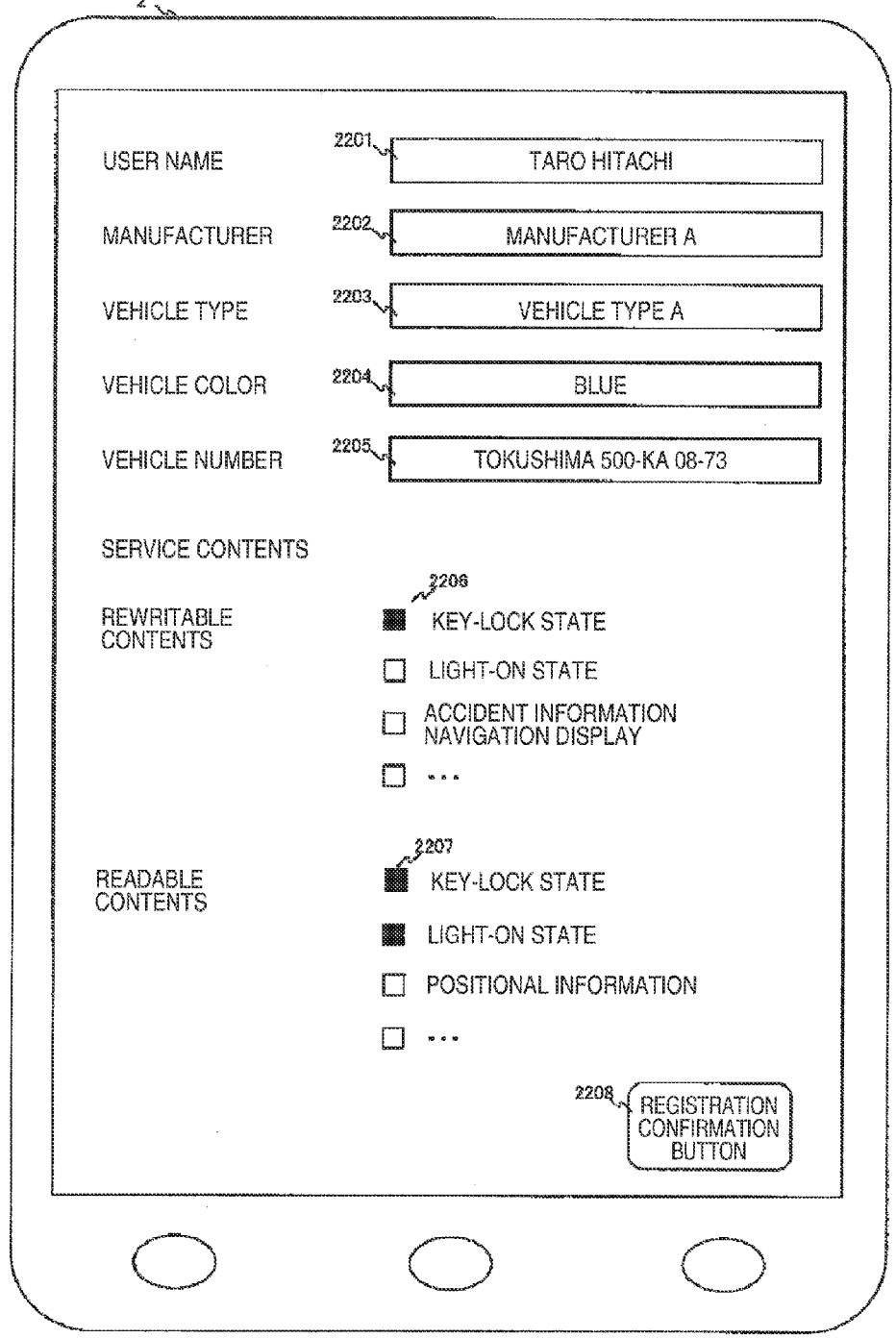
FIG. 18 illustrates a display screen of newly updated service contents on the information processing device having a communication function.

FIG. 18 shows an example of a screen displayed by the information processing device having a communication function 2 at the step 204.

Into a user name 2201, a name of a user applying for a service is input. For example, the user may input the user name 2201 by using a touch panel, or may input the user name 2513 acquired from the user related information 251.

Into a manufacturer 2202, a manufacturer with which the service provider has made a contract is input. For example, manufacturers are displayed by pulldown, and the user may select and input a manufacturer of an automobile owned by the user.

Into a vehicle type 2203, a vehicle type sold by the manufacturer 2202 is input. For example, vehicle types are displayed by pulldown, and the user may select and input a relevant vehicle type.

Into a vehicle color 2204, a vehicle color sold as the vehicle type 2203 is input. For example, vehicle colors are displayed by pulldown, and the user may select and input a relevant vehicle color.

Into a vehicle number 2205, a vehicle number of the automobile owned by the user is input. For example, the user may input it using the touch panel, or may acquire and input a relevant vehicle number from the user related information 251 by holding vehicle numbers in the user related information 251 in advance.

Into rewritable contents 2206, rewritable contents that can be provided by the service providing server 3 are input. For example, rewritable contents may be input on the basis of the service contents list 343 received from the service providing server 3 by using a radio button.

Into readable contents 2207, readable contents that can be provided by the service providing server 3 are input. For example, readable contents that can be provided may be input on the basis of the service contents list 343 received from the service providing server 3 by using the radio button.

A registration confirmation button 2208 is a button to transmit the contents from the above-described 2201 to 2207 to the service providing server 3.

At step 205, the application 23 transmits, to the service providing server 3, user name 2201, manufacturer 2202, vehicle type 2203, vehicle color 2204, and vehicle number 2205 as application contents input at the step 204, as well as the user ID 2512 corresponding to the user name, the VIN 2514, and the instruction command 3431 corresponding to items selected as rewritable contents and readable contents.

At step 305, the service provision request source authentication unit 32 and the access instruction control unit 33 store the received application contents in records of the service provision request source information 341 and the access instruction information 342.

At step 306, the available service registration unit 35 transmits the user ID 3411 who made an application, the user PASS 3413, and the VIN 3414 to the ACL management server 4 and requests change of a relevant ACL.

At step 404, the request source authentication unit 42 performs authentication processing of the service providing server 3 requesting the ACL change.

At step 405, the ACL change determination unit 45 determines authenticity of contents, change of which is requested, by using the ACL change determination information 464.

At step 406, the ACL change determination unit 45 changes the ACL 465 according to the contents of which authenticity is recognized at the step 405.

At step 407, the ACL change determination unit 45 transmits an ACL change completion notice to the service providing server 3.

At step 408, the ACL change determination unit 45 transmits an application contents registration completion notice to the information processing device having a communication function 2.

At step 206, the application 23 displays an application completion screen by using the screen display unit 22.

The above steps enable the information processing device having a communication function 2 to complete initial registration of service provision.

Figure 4:
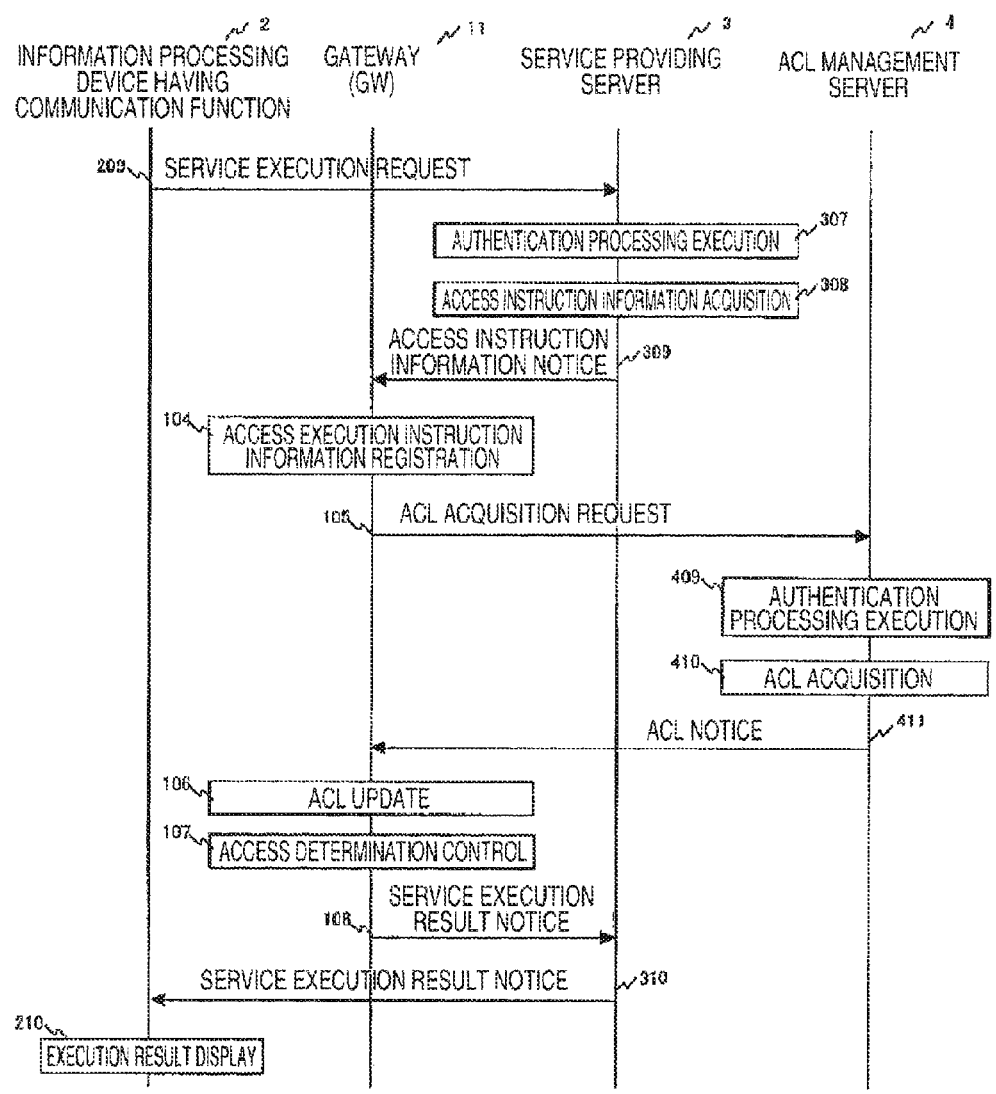
FIG. 4 illustrates a processing sequence at a time of service use.

FIG. 4 shows a schematic processing sequence at a time of service use using the information processing device having a communication function 2.

At step 209, the application 23 transmits a service execution request to the service providing server 3.

At step 307, the service provision request source authentication unit 32 performs authentication processing of the information processing device having a communication function 2 by using the service provision request source information 341.

At step 308, the access instruction control unit 33 acquires a record associated with a user ID authenticated at the step 307 from the access instruction information 342.

At step 309, the access instruction control unit 33 transmits the CAN-ID 3433 associated with the instruction command 3424 in addition to the record of the access instruction information 342 acquired at the step 308 to the gateway 11.

At step 104, the access control management updating unit 14 stores the received record of the access instruction information 342, and CAN-ID 3433 associated with the instruction command 3424 in the access execution instruction information 154.

At step 105, the access control management updating unit 14 transmits the VIN 1511, the user ID 1512, and the user PASS 1522 associated with the user ID to the ACL management server 4. Because the access control management updating unit 14 transmits an ACL acquisition request to the ACL management server 4 after receiving an access instruction information notice from the access instruction control unit 33 at the step 309, the access control management updating unit 14 is able to acquire the latest ACL at the time.

At step 409, the request source authentication unit 42 performs authentication processing of the gateway 11 by using the ACL acquisition request source information 461.

At step 410, the ACL acquisition unit 44 acquires a record associated with a VIN of an automobile equipped with the gateway 11 authenticated at the step 409 from the ACL 465.

At step 411, the ACL acquisition unit 44 transmits the record of the ACL 465 acquired at the step 410 to the gateway 11.

At step 106, the access control management updating unit 14 updates a record of the determination ACL 151 with the received record of the ACL 465.

At step 107, the control information transfer control unit 13 identifies an attribute of an access destination from the access destination transformation information 153 on the basis of the CAN-ID 3425 of the access execution instruction information 154 stored at the step 104, determines whether access to the identified access destination attribute should be granted or not using the determination ACL 151, and the control information access unit 16 transmits an instruction command to a relevant ECU and receives a response from the ECU.

At step 108, the control information transfer control unit 13 transmits the response from the ECU received from the control information access unit 16 to the service providing server 3. For example, returning a key state of the doors of an automobile is assumed as a response to transmitting an instruction command "read Key Lock" to check the key state of the doors of the automobile to an ECU.

At step 310, the access instruction control unit 33 transmits a received service execution result notice to the information processing device having a communication function 2.

At step 210, the application 23 displays the received service execution result on the screen by using the screen display unit 22.

The above steps enable the information processing device having a communication function 2 to use the service.

Figure 5:
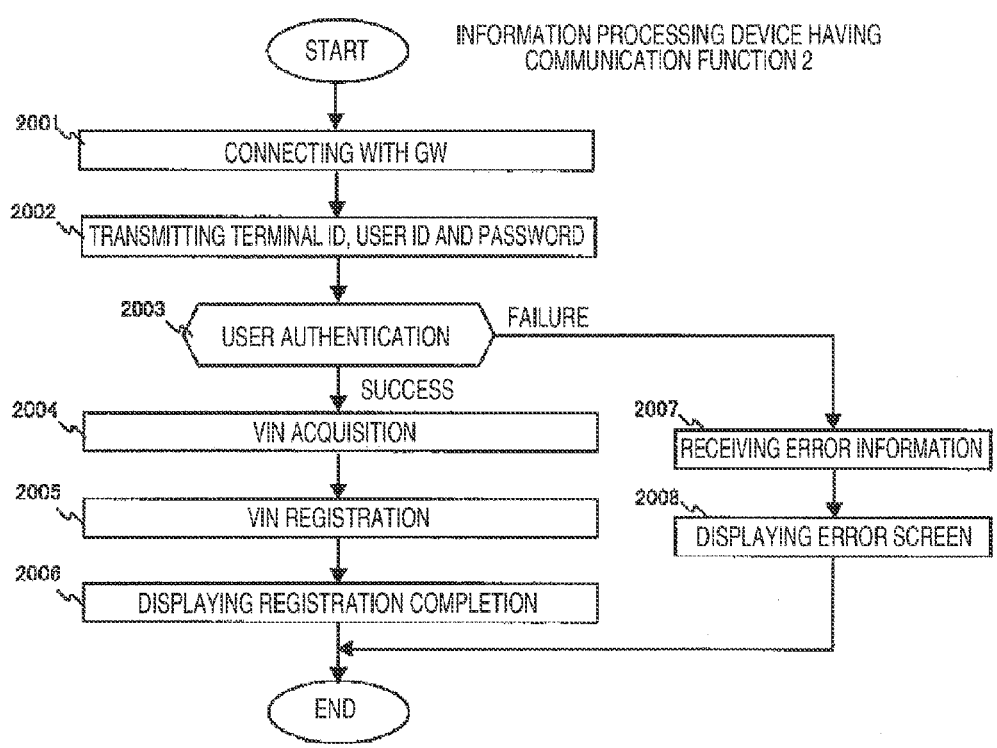
FIG. 5 illustrates a schematic processing flowchart at an information processing device having a communication function in order to achieve VIN acquisition.

FIG. 5 shows a schematic processing flow from the step 201 to the step 202 of the information processing device having a communication function 2.

At step 2001, the application 23 connects with the gateway 11 by using Bluetooth communication or USB connection. Here, a communication address for Bluetooth may be, for example, issued when a user makes a contract with an auto manufacturer and held in a tamper-resistant region of the information processing device having a communication function 2.

At step 2002, the application 23 transmits a terminal ID, a user ID, and a password to the gateway 11. At this time, the terminal ID and the user ID may be acquired from the user related information 251 or input by the user using the touch panel.

At step 2003, the access control management updating unit 14 performs user authentication processing on the basis of the information transmitted at the step 2002. The application 23 proceeds to step 2004 if the user authentication is successful, and proceeds to step 2007 if the user authentication is failed.

At the step 2004, the application 23 acquires a VIN from the gateway 11.

At step 2005, the application 23 registers the acquired VIN with the VIN 2514 of the user related information 251.

At step 2006, the application 23 displays registration completion of the VIN on the screen by using the screen display unit 22.

At the step 2007, the application 23 receives error information indicating failed user authentication from the gateway 11.

At step 2008, the application 23 displays an error screen by using the screen display unit 22.

The above steps enable the information processing device having a communication function 2 to acquire the VIN from the gateway 11.

Figure 6:
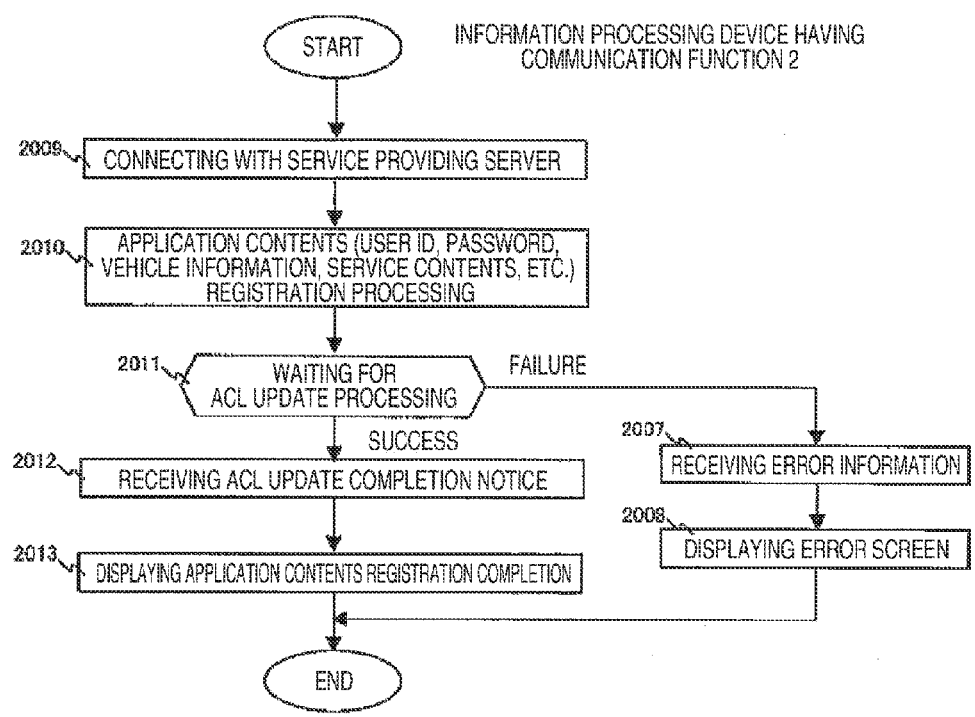
FIG. 6 illustrates a schematic processing flowchart at the information processing device having a communication function in order to achieve application contents registration and ACL change.

FIG. 6 shows a schematic processing flow from the step 203 to the step 206 of the information processing device having a communication function 2.

At step 2009, the application 23 connects with the service providing server 3. Here, as a connection method to the service providing server 3, for example, a browser may be used to connect with a web page of the service providing server 3 or an application distributed by the service providing server 3 may be activated for connection.

At step 2010, the application 23 transmits a user ID, user name, user password (PASS), VIN, manufacturer, vehicle type, vehicle color, vehicle number, and rewritable contents and readable contents as service contents to the service providing server 3.

At step 2011, the application 23 is waiting for the processing from the step 306 to the step 407. The application 23 proceeds to step 2012 if ACL change processing is successful, and proceeds to the step 2007 if the ACL change processing is failed.

At the step 2012, the application 23 receives an ACL change completion notice from the ACL management server 4.

At step 2013, the application 23 displays application contents registration completion on the screen by using the screen display unit 22.

The above steps enable the information processing device having a communication function 2 to complete initial registration of service provision.

Figure 7:
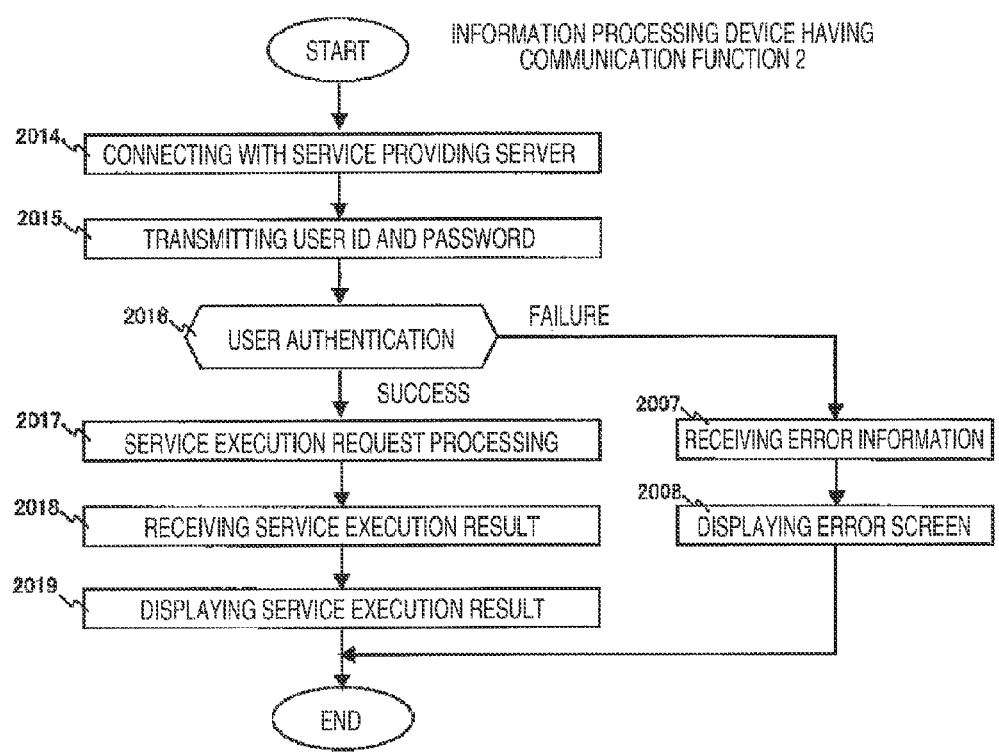
FIG. 7 illustrates a schematic processing flowchart at the information processing device having a communication function in order to achieve service use.

FIG. 7 shows a detailed processing flow of the information processing device having a communication function 2 from the step 209 to the step 210 shown in FIG. 4.

At step 2014, the application 23 connects with the service providing server 3 at the time of service use. Here, as a connection method to the service providing server 3, for example, the browser may be used to connect with the web page of the service providing server 3 or the application distributed by the service providing server 3 may be activated for connection.

At step 2015, the application 23 transmits a user ID and a password to the service providing server 3. For example, as the user ID, the user ID 2512 of the user related information 251 may be acquired and transmitted. Furthermore, as the password, the password input at the step 2010 may be held in the memory and transmitted as a password to be transmitted to the service providing server 3.

At step 2016, the service provision request source authentication unit 32 performs authentication processing on the basis of the user ID and the password transmitted at the step 2015. The application 23 proceeds to step 2017 if the user authentication is successful, and proceeds to the step 2007 if the user authentication is failed.

At the step 2017, the application 23 is waiting for the processing from the 308 to the step 108.

At step 2018, the application 23 receives a service execution result from the service providing server 3.

At step 2019, the application 23 displays the received service execution result on the screen.

The above steps enable the application 23 to use the service.

Figure 8:
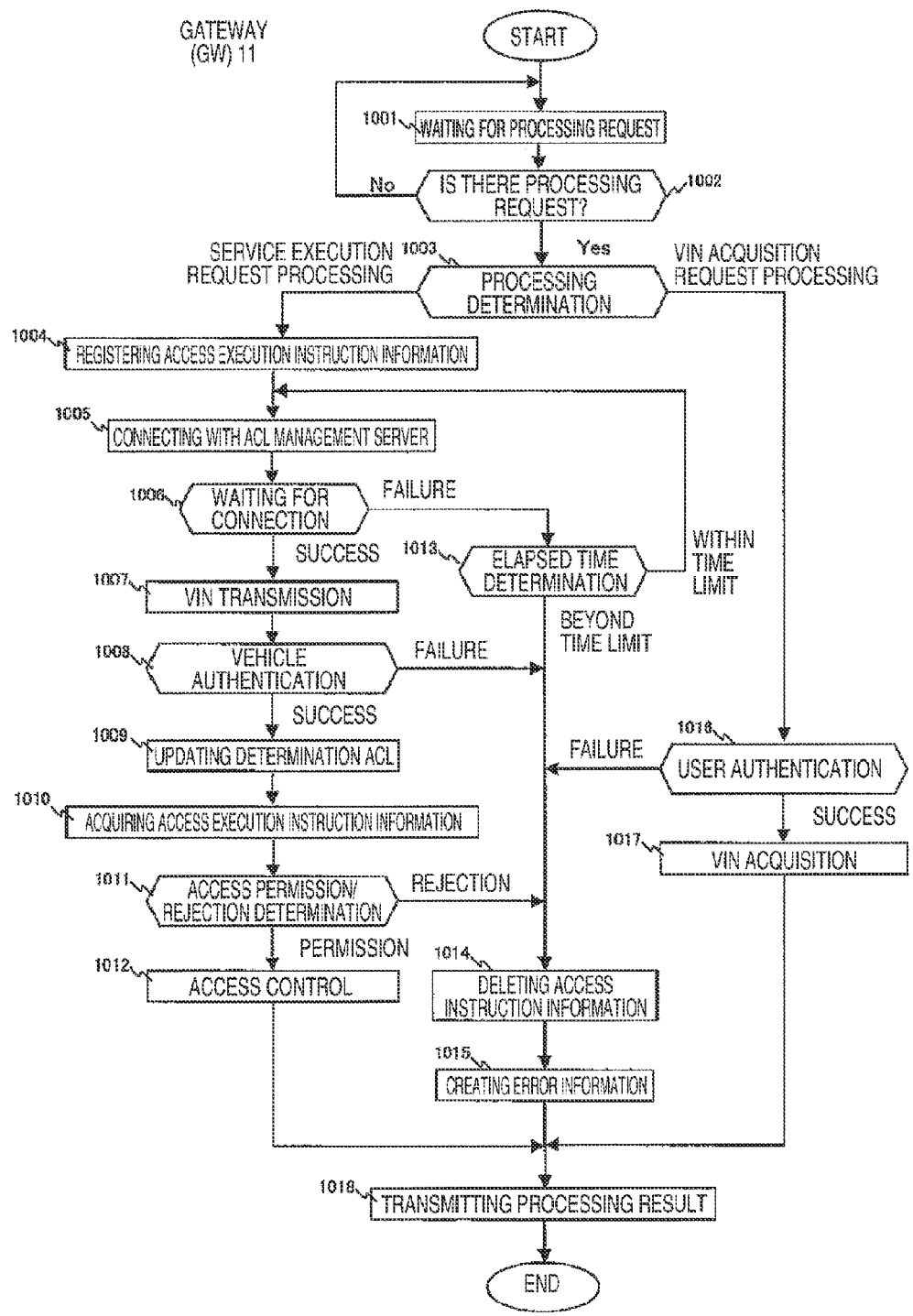
FIG. 8 illustrates a schematic processing flowchart at the gateway in order to achieve VIN acquisition and access determination control.

FIG. 8 shows a detailed processing flow of the gateway 11 from the step 101 to the step 108 in FIGS. 3 and 4.

At step 1001, the access control management updating unit 14 is waiting for a processing request.

At step 1002, the access control management updating unit 14 proceeds to step 1003 if there has been a processing request, and proceeds to the step 1001 if there is no processing request.

At step 1003, the access control management updating unit 14 proceeds to step 1004 if the received processing request is service execution request processing, and proceeds to the step 1016 if the requested processing is VIN acquisition request processing. For example, the access control management updating unit 14 may perform processing determination by putting an identifier indicating processing contents in a request processing message.

At the step 1004, the access control management updating unit 14 stores received access instruction information in the access execution instruction information 154.

At step 1005, the access control management updating unit 14 connects with the ACL management server 4. For example, an auto manufacturer may set a communication address in the memory of the gateway 11 at the time of contract.

At step 1006, the access control management updating unit 14 is waiting for connection with the ACL management server 4. The access control management updating unit 14 proceeds to step 1007 if the connection is successful, and proceeds to step 1013 if the connection is failed.

At the step 1007, the access control management updating unit 14 transmits the VIN 1511 to the ACL management server 4.

At step 1008, the ACL management server 4 is performing vehicle authentication. The process proceeds to step 1009 if the vehicle authentication is successful, and proceeds to step 1014 if the vehicle authentication is failed.

At step 1009, the access control management updating unit 14 receives the ACL 465 from the ACL management server 4, and stores it as the determination ACL 151.

At step 1010, the access control management updating unit 14 acquires the access execution instruction information 154 stored at the step 1004.

At step 1011, the control information transfer control unit 13 determines whether access should be permitted or not using the determination ACL. The control information transfer control unit 13 proceeds to step 1012 if the access is permitted, and proceeds to step 1014 if the access is rejected.

At the step 1012, the control information transfer control unit 13 performs an instruction command held in the access instruction information.

At step 1013, the access control management updating unit 14 measures time from starting connection, proceeds to the step 1014 if a preset time has passed, and proceeds to the step 1005 if it has not passed.

At the step 1014, the access control management updating unit 14 deletes the access instruction information stored at the step 1004.

At step 1015, the control information transfer control unit 13 creates error information.

At step 1016, the access control management updating unit 14 performs user authentication on the basis of the user ID and the user PASS received from the information processing device having a communication function 2. The access control management updating unit 14 proceeds to step 1017 if the user authentication is successful, and proceeds to the step 1014 if the user authentication is failed.

At the step 1017, the control information transfer control unit 13 acquires the VIN 1511 of the determination ACL 151.

At step 1018, the control information transfer control unit 13 transmits a processing result of any of the steps 1012, 1015 and 1017 to the request source at the step 1002.

The above steps enable the gateway 11 to achieve VIN acquisition processing and service execution request processing.

Figure 9:
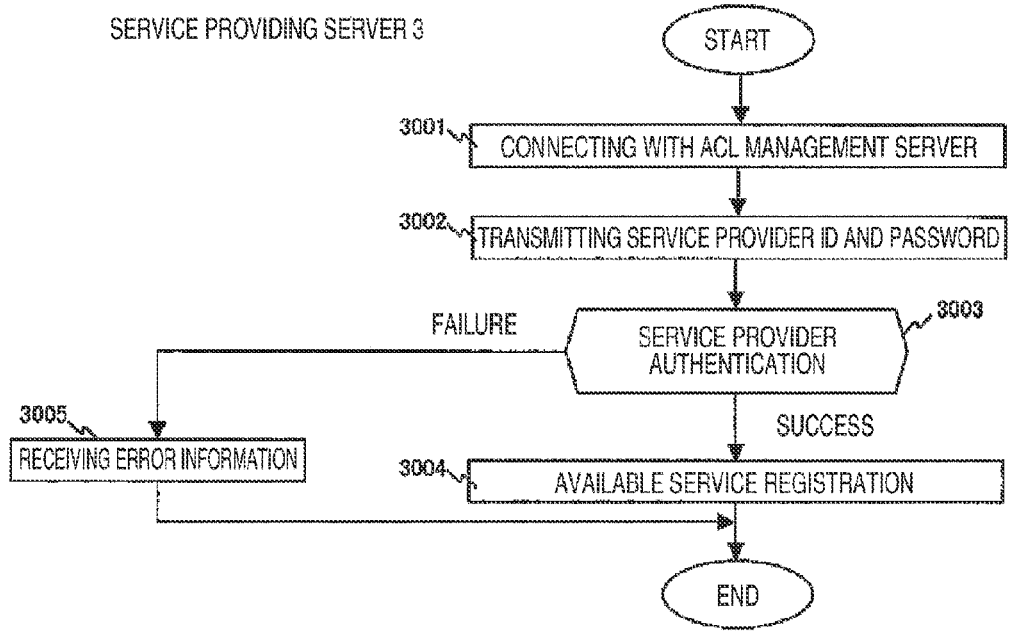
FIG. 9 illustrates a schematic processing flowchart at a service providing server in order to achieve available service registration.

FIG. 9 shows a detailed processing flow of the service providing server 3 from the step 301 to the step 302 in FIGS. 3 and 4.

At step 3001, the available service registration unit 35 connects with the ACL management server 4. For example, the available service registration unit 35 may connect with the ACL management server 4 by using the communication address distributed at the time of contract with an auto manufacturer.

At step 3002, the available service registration unit 35 transmits the service provider ID 3421 and a password associated with the service provider ID 3421 to the ACL management server 4. For example, the available service registration unit 35 may have registered the service provider ID and the password at the time of contract with the auto manufacturer.

At step 2003, the ACL management server 4 is performing the step 401 and the step 402. The service providing server 3 proceeds to step 3004 if service provider authentication by the ACL management server 4 is successful, and proceeds to step 3005 if the service provider authentication is failed.

At the step 3004, the access instruction control unit 33 registers an available service received from the ACL management server 4 with the access instruction information 342.

At the step 3005, the access instruction control unit 33 receives error information from the ACL management server 4 and finishes available service acquisition processing.

The above steps enable the service providing server 3 to achieve available service acquisition processing.

Figure 10:
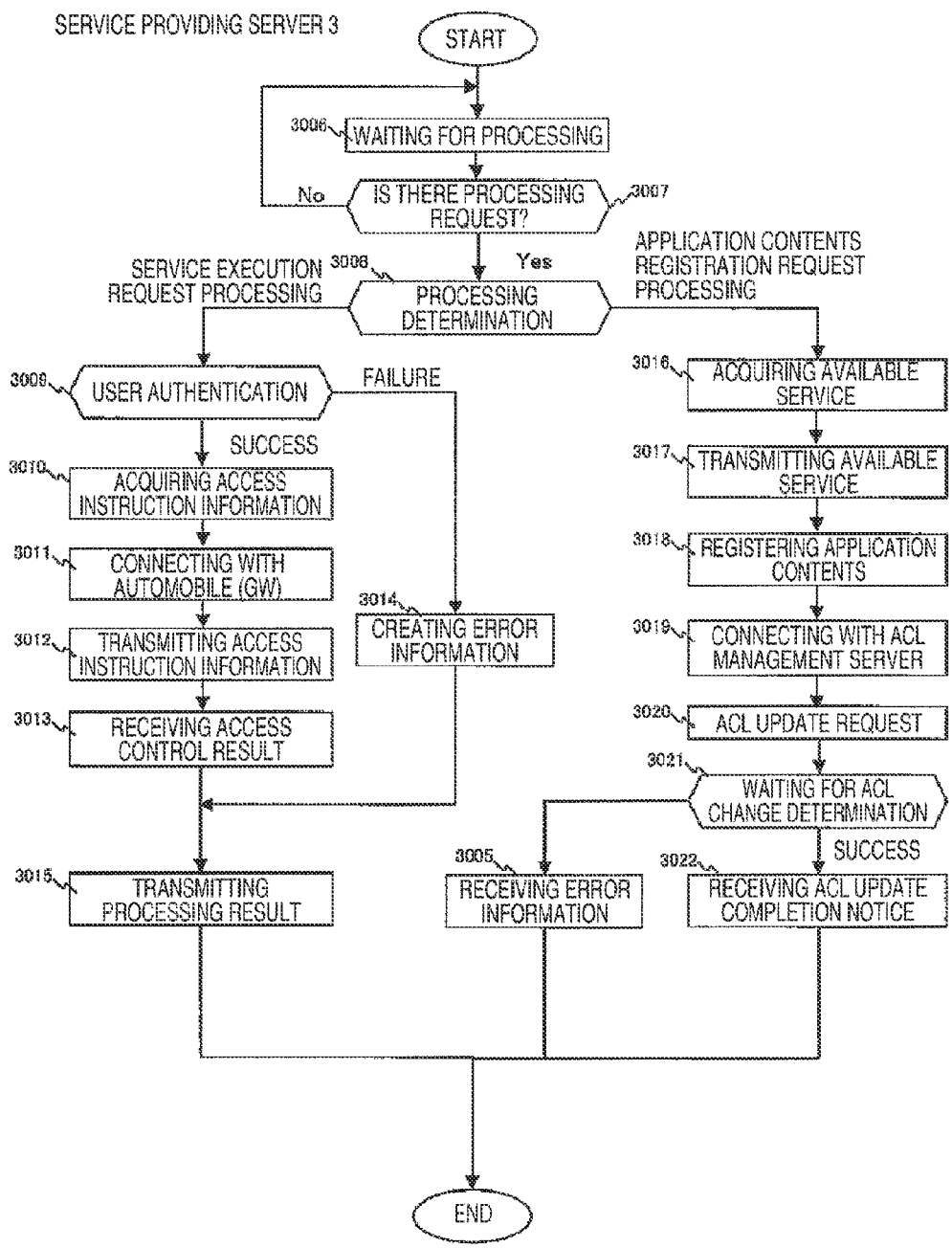
FIG. 10 illustrates a schematic processing flowchart at the service providing server in order to achieve application contents registration and service execution request.

FIG. 10 shows a detailed processing flow of the service providing server 3 from the step 303 to the step 310 in FIGS. 3 and 4.

At step 3006, the available service registration unit 35 is waiting for processing.

At step 2007, the available service registration unit 35 proceeds to step 3008 if there has been a processing request and proceeds to the step 3006 if there is no processing request.

At the step 3008, the available service registration unit 35 proceeds to step 3009 if the received processing request is service execution request processing, and proceeds to step 3015 if the received processing request is application contents registration request processing. For example, the available service registration unit 35 may perform processing determination by putting an identifier indicating processing contents in a request processing message.

At the step 3009, the service provision request source 32 performs user authentication processing by using the user ID and the user PASS transmitted at the step 2015 by the information processing device having a communication function 2, and the user ID 3411 and the user PASS 3413 held in the service provision request source information 341. The service provision request source 32 proceeds to step 3010 if the user authentication is successful, and proceeds to step 3014 if the user authentication is failed.

At the step 3010, the access instruction control unit 33 acquires a record associated with the user authenticated at the step 3009 from the access instruction information 342.

At step 3011, the access instruction control unit 33 connects with the gateway 11. For example, the access instruction control unit 33 may acquire a communication address of the gateway 11 corresponding to a relevant VIN from the ACL management server 4 on the basis of the VIN of the automobile owned by the user, or may acquire the communication address of the gateway 11 at a time of application contents registration from the information processing device having a communication function 2 at step 3018.

At step 3012, the access instruction control unit 33 transmits the access instruction information acquired at the step 3010 to the gateway 11.

At step 3013, the access instruction control unit 33 receives an access control result from the gateway 11.

At step 3014, the service provision request source 32 creates error information.

At the step 3015, the access instruction control unit 33 transmits a processing result at the step 3013 or the step 3014 to the information processing device having a communication function 2.

At step 3016, the available service registration unit 35 acquires an available service from the service contents list 343.

At step 3017, the available service registration unit 35 transmits the available service acquired at the step 3016 to the information processing device having a communication function 2.

At step 3018, the access instruction control unit 33 stores, as a record of the access instruction information 342, the user ID, user name, user password (PASS), VIN, manufacturer, vehicle type, vehicle color, vehicle number, and rewritable contents and readable contents as service contents received from the information processing device having a communication function 2.

At step 3019, the access instruction control unit 33 connects with the ACL management server 4. For example, the access instruction control unit 33 may connect with the ACL management server 4 by using the communication address distributed at the time of contract with the auto manufacturer.

At step 3020, the access instruction control unit 33 transmits a service provider ID and an attribute type of an access destination of an application request to the ACL management server 4.

At step 3021, the ACL management server 4 is performing the processing from the step 404 to the step 406. The access instruction control unit 33 proceeds to step 3022 if change of the ACL 465 is successful, and proceeds to the step 3005 if the change of the ACL 465 is failed.

At the step 3022, the access instruction control unit 33 receives an ACL change completion notice from the ACL management server 4.

The above steps enable the service providing server 3 to achieve application contents registration processing and service execution processing.

FIG. 11 shows a detailed processing flow of the ACL management server 4 from the step 401 to the step 411 in FIGS. 3 and 4.

At step 4001, the request source authentication unit 42 is waiting for processing.

At step 4002, the request source authentication unit 42 proceeds to step 4003 if there has been a processing request, and proceeds to the step 4001 if there is no processing request.

At the step 4003, the request source authentication unit 42 performs vehicle authentication processing of the gateway 11 or service provider authentication of the service providing server 3 by using the ACL acquisition request source information 461 or the service provider information 462.

At step 4004, the request source authentication unit 42 proceeds to step 4005 if the received processing request is ACL change processing, proceeds to step 4007 if the received processing request is available service acquisition processing, and proceeds to step 4008 if the received processing request is ACL acquisition processing. For example, the ACL management server 4 may perform processing determination by putting an identifier indicating processing contents in the request processing message.

At the step 4005, the ACL change determination unit 45 performs ACL change determination processing by using the service provider ID and the attribute type received from the service providing server 3, and the ACL change determination information 464. The ACL change determination unit 45 proceeds to step 4006 if the ACL change determination is successful, and proceeds to step 4009 if the ACL change determination is failed.

At the step 4006, the ACL change determination unit 45 stores, as a record of the ACL 465, the VIN, user ID, service provider ID, rewritable contents, readable contents, and change date and time received from the service providing server 3.

At the step 4007, the available service acquisition unit 43 transmits an instruction type, a CAN-ID, an instruction command, service contents, and an attribute type to the service provider ID of the service providing server 3.

At the step 4008, the ACL acquisition unit 44 acquires a record of the ACL 465 on the basis of a VIN of an automobile equipped with the gateway 11.

At the step 4009, the ACL change determination unit 45 creates error information on the basis of error information.

At step 4010, any of the ACL change determination unit 45, the available service acquisition unit 43, and the ACL acquisition unit 44 transmits a processing result of the step 4006 or any of the steps 4007, 4008 and 4009 to the processing request source.

The above steps enable the ACL management server 4 to achieve the ACL change processing, the available service acquisition processing, and the ACL acquisition processing.

The above-described vehicle information relay control system sets an accessible range as an ACL depending on authority per service provider. This enables the gateway 11 to distinguish service providers and finely control the access range to each ECU 17.

Furthermore, the ACL management server 4 changes or deletes the ACL 151 in which the accessible range is set by using the ACL change determination information 464. This enables safe management of the accessible range even in a manager absent situation specific to on-vehicle network systems.

Second Embodiment

As a second embodiment, the gateway 11 is assumed to be unable to communicate with the service providing server 3 and the ACL management server 4 at the time of service use.

In the second embodiment, the application 23 acquires the access instruction information 342 and the CAN-ID 3433 from the service providing server 3 at the time of service application contents registration, and stores it as a record of the acquired access instruction information 252. In addition, the application 23 acquires a record of the ACL 465 attached with a period of validity from the ACL management server 4 at the time of ACL change completion, and stores it as a record of the acquired ACL 253. At the time of service use, the application 23 transmits the records of the acquired access instruction information 252 and the user ID 2512 to the gateway 11, and the access control management updating unit 14 stores the received records as a record of the access execution instruction information 154. When the access control management updating unit 14 is able to perform local communication with the information processing device having a communication function 2, the access control management updating unit 14 acquires the acquired ACL 253 from the information processing device having a communication function 2, and stores it as a record of the determination ACL 151, thereby controlling access determination and performing the service on the basis of access execution instruction information.

A processing sequence of the second embodiment comprises available service notification processing, VIN acquisition processing, service initial registration processing, and service use processing in the same manners as those of FIGS. 3(a), 3(b), 3(c) and 4 in the first embodiment.

Figure 3A:
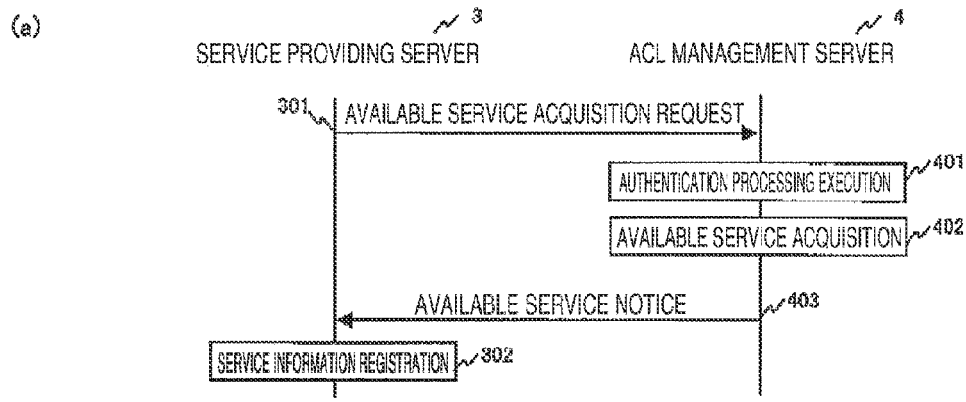
FIG. 3(a) illustrates an available service acquisition processing sequence.

The available service notification processing in the second embodiment is the same as the steps 301 to 302 in FIG. 3(a) of the first embodiment.

Figure 3B:
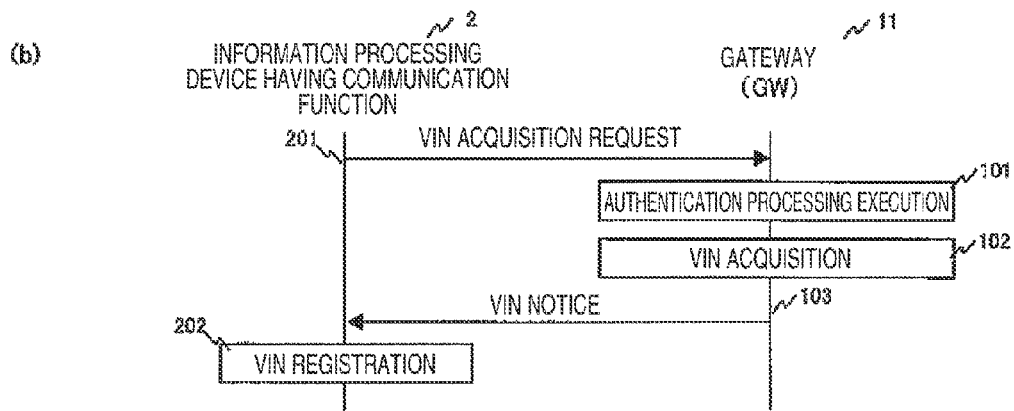
FIG. 3(b) illustrates a VIN acquisition processing sequence.

The VIN acquisition processing in the second embodiment is the same as the steps 201 to 202 in FIG. 3(b) of the first embodiment.

The service initial registration processing in the second embodiment is the same as far as the steps 203 to 205 and 306 to 407 in FIG. 3(c) of the first embodiment.

Regarding the step 305, the service provision request source authentication unit 32 and the access instruction control unit 33 transmit records of the CAN-ID 3433 and the access instruction information 342 to the information processing device having a communication function 2 at the time of application contents registration. The application 23 stores the received records in the acquired access instruction information 252.

Regarding the step 408, the ACL change determination unit 45 transmits an application contents registration completion notice to the information processing device having a communication function 2, and also transmits a record of a relevant user managed in the ACL 465.

Regarding the step 206, the application 23 displays the application contents registration completion notice received from the ACL management server 4 on the screen by using the screen display unit 22, and stores the record of the ACL 465 as a record of the acquired ACL 253.

The service use processing in the second embodiment is the same as far as the steps 104 and 106 to 210 in FIG. 4 of the first embodiment.

In the step 209, the application 23 transmits a record of the acquired access instruction information 252 corresponding to a service of which execution is requested to the gateway 11, and proceeds to the step 104.

Figure 19:
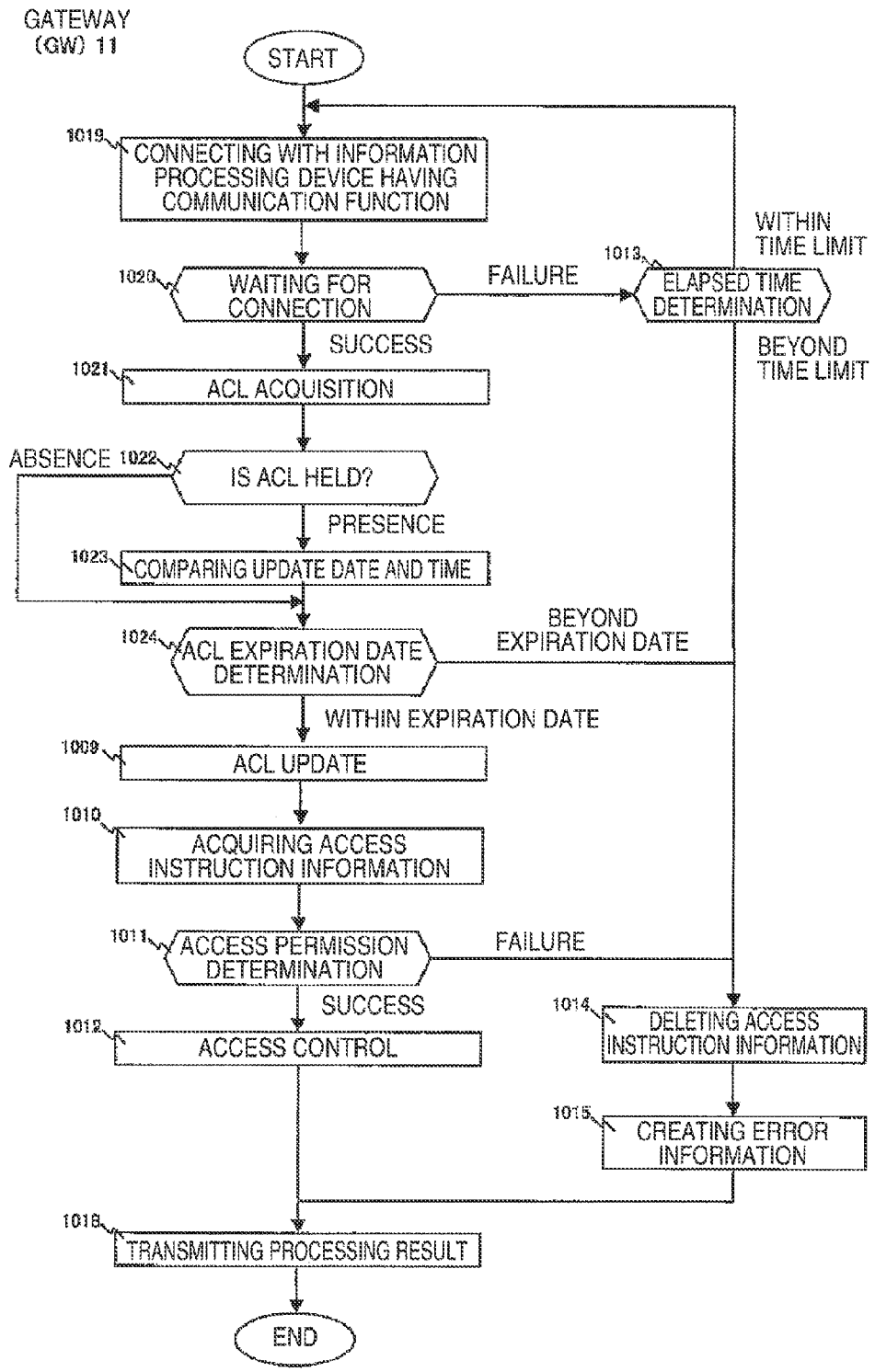
FIG. 19 illustrates a schematic processing flowchart at the gateway if the gateway cannot communicate with the ACL management server.

In the step 105, it is assumed that the access control management updating unit 14 tries to connect with the ACL management server 4 but cannot connect. In the second embodiment, if an elapsed time exceeds a time limit at the step 1013 in FIG. 8, the access control management updating unit 14 proceeds to step 1019 in FIG. 19.

In the step 1019, the access control management updating unit 14 connects with the information processing device having a communication function 2. For example, the access control management updating unit 14 may hold a communication address of the information processing device having a communication function 2 in the access request source information 152 at the time of VIN acquisition processing.

At step 1020, the access control management updating unit 14 proceeds to step 1021 if connection with the information processing device having a communication function is successful, and proceeds to the step 1013 if the connection is failed.

At the step 1021, the control information transfer control unit 13 acquires the acquired ACL 253 from the information processing device having a communication function 2 and stores it in the memory.

At step 1022, the control information transfer control unit 13 checks if the determination ACL 151 has been already held. The control information transfer control unit 13 proceeds to step 1023 if the determination ACL 151 has been held, and proceeds to step 1024 if the determination ACL 151 has not been held.

At the step 1023, the control information transfer control unit 13 compares the change date and time 2535 of the acquired ACL 253 acquired at the step 1021 with the change date and time 1516 of the determination ACL 151 already held, and selects an ACL with newer change date and time.

At the step 1024, the control information transfer control unit 13 determines whether the expiration date 2537 of the acquired ACL 253 is expired if it has proceeded from the step 1022, and whether the expiration date 2537 of an ACL with newer change date and time of the acquired ACL 253 or the determination ACL 151, or the expiration date 1517 is expired if it has proceeded from the step 1024. The control information transfer control unit 13 proceeds to the step 1009 if the ACL is within the period of validity, and proceeds to the step 1014 if the ACL is beyond the period of validity.

The above steps enable the gateway 11 to control access determination even if the gateway 11 is not able to communicate with the ACL management server 4 at the time of service use.

The embodiment can provide the same effect as that of the first embodiment. In addition, even if the gateway 11 cannot communicate with the service providing server 3 and the ACL management server 4 at the time of service use as a service use environment, the embodiment can provide the same effect as that of the first embodiment.

Third Embodiment

As a third embodiment, a control information transfer control unit is assumed to be arranged in the ACL management server 4.

A processing sequence of the third embodiment comprises available service notification processing, VIN acquisition processing, service initial registration processing, and service use processing in the same manners as those of FIGS. 3(*a*), 3(*b*), 3(*c*) and 4 in the first embodiment.

The available service notification processing in the third embodiment is the same as the steps 301 to 302 in FIG. 3(*a*) of the first embodiment.

The VIN acquisition processing in the third embodiment is the same as the steps 201 to 202 in FIG. 3(*b*) of the first embodiment.

The service initial registration processing in the third embodiment is the same as the steps 203 to 206 in FIG. 3(*c*) of the first embodiment.

The service use processing in the third embodiment is the same as far as the steps 209 to 308, 409 to 410, and 210 in FIG. 4 of the first embodiment.

Figure 20:
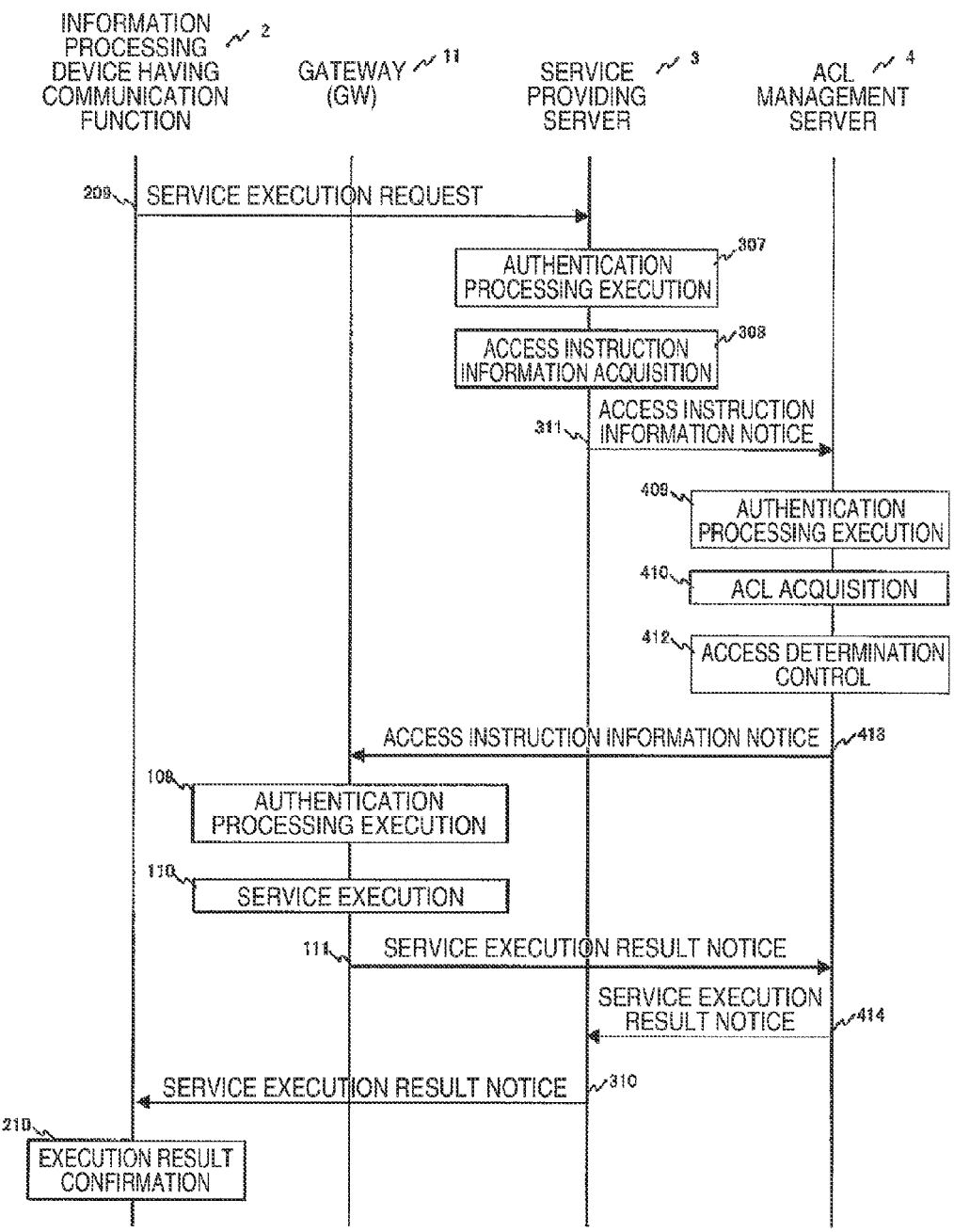
FIG. 20 illustrates a processing sequence at a time of service use if the ACL management server executes access determination control.

FIG. 20 shows a schematic processing sequence of the service use processing in the third embodiment.

At step 311, the access instruction control unit 33 transmits a record of the access instruction information 342 and the attribute type 3435 to the ACL management server 4.

At step 412, the ACL change determination unit 45 compares the received record of the access instruction information 342 and the attribute type 3435 associated with an instruction command with the ACL 465, and determines whether access by the service providing server 3 should be permitted or not.

At step 413, the ACL change determination unit 45 transmits the instruction command 3424 of the access instruction information 342 and the CAN-ID 3433 to the gateway 11 if the access can be permitted, and transmits an access rejection notice to the service providing server 3 if the access cannot be permitted.

At step 109, the access control management updating unit 14 performs authentication processing of the ACL management server 4. For example, the auto manufacturer makes the gateway 11 hold an ID and a password of the ACL management server in the memory of the gateway 11 at the time of contract. At the step 413, the ACL change determination unit 45 transmits the ID and the password of the ACL management server, and the access control management updating unit 14 performs authentication processing by using the ID and the password held in advance.

At step 110, the control information transfer control unit 13 performs the service by transmitting the instruction command 3424 in response to the received CAN-ID.

At step 111, the control information transfer control unit 13 transmits a service execution result at the step 110 to the ACL management server 4.

At step 414, the ACL change determination unit 45 transmits the received service execution result to the service providing server 3.

At step 310, the access instruction control unit 33 transmits the received service execution result to the information processing device having a communication function 2.

The above steps enable the embodiment 3 to achieve service use when control information transfer control is arranged in the ACL management server 4.

The embodiment can also provide the same effect as that of the first embodiment. In addition, even when the control information transfer control unit is arranged in the ACL management server 4 as function arrangement in the system, the embodiment can provide the same effect as that of the first embodiment.

REFERENCE SIGNS LIST

1 Automobile
11 Gateway
2 Information processing device having a communication function
3 Service providing server
4 ACL management server
5 Communication network

The invention claimed is:

1. A gateway device for controlling access to an electronic control unit connected with an internal vehicle network from an external network, the gateway device comprising:
 a control information transfer control unit, implemented by a hardware processor;

an access control management updating unit, implemented by a hardware processor; and a control information access unit, implemented by a hardware processor, wherein the access control management updating unit, when receiving an access execution instruction from the external network, acquires determination information on the access execution instruction, the determination information being set an accessible attribute of the electronic control unit per transmission source of the access execution instruction;

the control information transfer control unit determines whether execution of the access execution instruction should be permitted or not based on the determination information, and transmits the access execution instruction, execution of which is determined to be permitted, to the control information access unit;

the control information access unit transmits the received access execution instruction to the electronic control unit, and transmits a result message of the access execution instruction to the control information transfer control unit;

the control information transfer control unit transmits the result message to the transmission source of the access execution instruction; and the access control management updating unit transmits an acquisition request for the determination information to a determination information management device connected with the external network to acquire the determination information after the gateway device receives the access execution instruction from the external network.

2. The gateway device according to claim 1, wherein the attribute set to the determination information is a type of the electronic control unit, or automotive safety integrity level (ASIL) defined per electronic control unit or function of the electronic control unit.

3. The gateway device according to claim 1, wherein the access control management updating unit transmits an acquisition request for the determination information to another information processing device having received and held the determination information from the determination information management device in advance to acquire the determination information if the determination information cannot be acquired from the determination information management device.

4. A service providing system for controlling access to an electronic control unit connected with an internal vehicle network from an external network, comprising a service enjoying device, a service providing device, a service execution management device, and a service execution determination information management device, wherein the service enjoying device, service providing device, service execution management device, and service execution determination information management device are hardware devices, wherein the service execution management device is connected with one or more electronic control units via the internal vehicle network;

the service enjoying device transmits a service execution request to the service providing device;

the service providing device transmits an access execution instruction based on the service execution request to the service execution management device via the external network;

the service execution management device transmits an acquisition request for determination information on the access execution instruction to the service execution determination information management device via the external network when receiving the access execution instruction from the service providing device;

the service execution determination information management device transmits the determination information to the service execution management device;

the service execution management device determines whether execution of the access execution instruction should be permitted or not based on the received determination information, transmits the access execution instruction, execution of which is determined to be permitted, to the one or more electronic control units via the internal network, and transmits an execution result based on the access execution instruction to the service providing device via the external network; and the service providing device transmits the received execution result to the service enjoying device, wherein the determination information indicates permission or rejection of executing the access execution instruction on the basis of a combination of an attribute of the service enjoying device, an attribute of the service providing device, and an attribute of the one or more electronic control units.

5. The service providing system according to claim 4, wherein the determination information uses a domain predefined for the one or more electronic control units as the attribute of the one or more electronic control units.

6. The service providing system according to claim 4, wherein the service enjoying device transmits a service application contents registration request to the service providing device;

the service providing device transmits a change request for the determination information based on the service application contents registration request to the service execution determination information management device; and the service execution determination information management device transmits a part related to the service enjoying device included in the determination information to the service enjoying device if the determination information has been changed based on the change request.

7. The service providing system according to claim 6, wherein the service execution management device transmits an acquisition request for the determination information on the access execution instruction to the service enjoying device if the determination information cannot be acquired from the service execution determination information management device;

the service enjoying device transmits the determination information acquired from the service execution determination information management device to the service execution management device; and the service execution management device determines whether execution of the access execution instruction should be permitted or not based on the determination information received from the service enjoying device.

* * * * *